US007016908B2

(12) United States Patent
Kataoka et al.

(10) Patent No.: US 7,016,908 B2
(45) Date of Patent: Mar. 21, 2006

(54) FILE PROCESSING METHOD, DATA PROCESSING APPARATUS AND STORAGE MEDIUM

(75) Inventors: Masahiro Kataoka, Kawasaki (JP); Takashi Tsubokura, Kawasaki (JP)

(73) Assignee: Fujitsu Limited, kawasaki (JP)

( * ) Notice: Subject to any disclaimer, the term of this patent is extended or adjusted under 35 U.S.C. 154(b) by 0 days.

(21) Appl. No.: 10/073,245

(22) Filed: Feb. 13, 2002

(65) Prior Publication Data

US 2002/0078062 A1   Jun. 20, 2002

Related U.S. Application Data

(63) Continuation of application No. PCT/JP99/04387, filed on Aug. 13, 1999.

(51) Int. Cl.
    *G06F 17/30* (2006.01)
(52) U.S. Cl. .................. 707/101; 707/200; 707/201; 707/202; 707/203; 707/204; 707/205; 707/104.1
(58) Field of Classification Search .............. 707/1–3, 707/101, 10, 200–205, 100, 104.1; 341/87, 341/51, 106; 704/258, 254; 382/232
See application file for complete search history.

(56) References Cited

U.S. PATENT DOCUMENTS

| 5,198,813 A | * | 3/1993 | Isozaki ..................... 341/59 |
| 5,333,313 A | * | 7/1994 | Heising ..................... 707/101 |
| 5,414,850 A |   | 5/1995 | Whiting |
| 5,951,623 A | * | 9/1999 | Reynar et al. ............ 708/203 |
| 6,078,923 A | * | 6/2000 | Burrows ................... 707/101 |
| 6,112,208 A | * | 8/2000 | Ikegami .................... 707/101 |
| 6,349,372 B1 | * | 2/2002 | Benveniste et al. ....... 711/159 |
| 6,438,556 B1 | * | 8/2002 | Malik et al. .............. 707/101 |
| 6,574,627 B1 | * | 6/2003 | Bergadano et al. ......... 707/9 |
| 2002/0120639 A1 | * | 8/2002 | Basin et al. .............. 707/204 |

FOREIGN PATENT DOCUMENTS

| JP | 4-359315 | 12/1992 |
| JP | 6-28150 | 2/1994 |
| JP | 6-222903 | 8/1994 |
| JP | 7-191822 | 7/1995 |
| JP | 8-241325 | 9/1996 |
| JP | 9-026902 | 1/1997 |
| JP | 9-26969 | 1/1997 |
| WO | 99/21092 | 4/1999 |
| WO | WO 99/21092 | * 4/1999 |
| WO | WO99-21092 | 4/1999 |

OTHER PUBLICATIONS

Uematsu, Tomohiko et al., "Program ya Text Data no tameno Kagyaku Asshuku Algolism wo rikaisuru", *Interface*, vol. 18, No. 8, Aug. 1, 1992, CQ Shuppansha ed. (Tokyo), pp. 88-123.

Amakasu, Hide et al., "Koredemo mada DOX 6 ni shinai?", *Gekkan Asukii*, vol. 18, No. 5, May 1, 1994, Kabushiki Kaisha Asukii (Tokyo), pp. 241-264 (especially p. 252).

(Continued)

*Primary Examiner*—Cam Y Truong
(74) *Attorney, Agent, or Firm*—Staas, Halsey LLP

(57) ABSTRACT

A file processing method, a data processing apparatus and a storage medium divides a file into a plurality of sections and compresses each section of the file using a plurality of compression parameters, and stores a compressed file in a storage medium.

47 Claims, 17 Drawing Sheets

OTHER PUBLICATIONS

English Translation (pp. 1-53) of Uematsu, Tomohiko et al., "Program ya Text Data no tameno Kagyaku Asshuku Algolism wo rikaisuru", *Interface*, vol. 18, No. 8, Aug. 1, 1992, CQ Shuppansha ed. (Tokyo), pp. 88-123.

English Translation (pp. 1-2) of p. 252 of Amakasu, Hide et al., "Koredemo mada DOX 6 ni shinai?", *Gekkan Asukii*, vol. 18, No. 5, May 1, 1994, Kabushiki Kaisha Asukii (Tokyo), pp. 241-264 (especially p. 252).

William H. Hsu et al., "Automatic Synthesis of Compression Techniques for Heterogeneous Files", Software Practice and Experience, vol. 25, No. 10, Oct. 1, 1995, XP 000655539, pp. 1097-1116.

U.S. Appl. No. 09/319,742, filed Jun. 11, 1999, Masahiro Kataoka et al.

Tomohiko Uematsu, "Introduction to Document Data Compression Algorithm", CQ Publishing Company Ltd.; 1994, pp. 39-64.

* cited by examiner

FILE PROCESSING METHOD, DATA PROCESSING APPARATUS AND STORAGE MEDIUM

This application is a continuing application, filed under 35 U.S.C. § 111(a), of International Application PCT/JP99/04387, filed Aug. 13, 1999.

TECHNICAL FIELD

The present invention generally relates to file processing methods, data processing apparatuses and storage media, and more particularly to a file processing method and a data processing apparatus which store a file in a storage medium with a high compression efficiency and read the stored compressed file from the storage medium, and to a storage medium which stores such a compressed file.

Recently, it has become possible to store in advance information of a dictionary, an encyclopedia or the like in a storage medium such as a CD-ROM, and to access the CD-ROM from a computer, so as to read and display the information of the dictionary, encyclopedia or the like. Hence, an extremely large amount of information related to the dictionary, encyclopedia or the like can be stored in a single CD-ROM which is compact. In addition, instead of obtaining the necessary information by opening the dictionary, encyclopedia or the like while using the computer, it is possible to read the necessary information from the CD-ROM, thereby making it possible to considerably reduce the trouble of obtaining the necessary information.

BACKGROUND ART

In the conventional CD-ROM which stores the information of the dictionary, encyclopedia or the like, a dictionary file is made up of dictionary data and data of index (hereinafter simply referred to as index data). In the case of the encyclopedia, for example, the dictionary data includes data of text (hereinafter simply referred to as text data) describing the meaning of a word, data of image (hereinafter simply referred to as image data) showing an animal if the word relates to an animal, for example, and data of audio (hereinafter simply referred to as audio data) indicating a chirping sound of a bird if the word relates to a bird, for example. The index is used to retrieve a desired dictionary data from the dictionary file, and is provided with respect to each dictionary data. The index is sometimes referred to as a keyword. The index data includes a catchword pointer, an item pointer and the like. Data of the catchword include a headword. Data of the item includes a headword, comment and the like.

Conventionally, the text data and the index data are stored in a non-compressed state, because the storage capacity of the CD-ROM is relatively large. On the other hand, the image data and the audio data are compressed according to appropriate compression techniques and stored in the CD-ROM, because the amount of information of the image data in particular is large.

But if one CD-ROM is required to store each dictionary or each encyclopedia, it is difficult to utilize the dictionary data with ease. Accordingly, it is desirable to store the information of a plurality of dictionaries, encyclopedias or the like in a single CD-ROM, but in this case, there was a problem in that the amount of information to be stored may exceed the storage capacity of the single CD-ROM even if the dictionary data is compressed. Moreover, even if the dictionary file to be stored in the CD-ROM relates to a single dictionary, encyclopedia or the like, there was a possibility that the storage capacity of the single CD-ROM will be exceeded even if the dictionary data is compressed, as the amount of information of the dictionary file increases.

For this reason, it is conceivable to compress not only the dictionary data, but to compress the entire dictionary file including the index data, and to store such compressed data in the CD-ROM. However, no proposal has been made which would enable compression of the entire dictionary file efficiently by a relatively simple method, and enable expansion of the compressed dictionary file within a short time. Particularly in the case of the dictionary, encyclopedia or the like, the amount of information of the index data is large. But if it takes time to carry out the process of restoring the index data when expanding the compressed dictionary file, the access time to the desired index data or dictionary data becomes long, and it becomes difficult to utilize the dictionary, encyclopedia or the like with ease.

In addition, when compressing the dictionary data in units of item of the index or in units of fixed length, for example, it takes time to carry out the process of expanding the dictionary file, similarly to the above described case, because the amount of information of the index data is large particularly for the dictionary, encyclopedia or the like, and it also becomes difficult to utilize the dictionary, encyclopedia or the like with ease. For example, a Japanese Laid-Open Patent Application No.9-26969 proposes a telephone directory retrieval system which employs a similar method. According to this proposed system, however, the index data is not compressed. This is because, in the case of the telephone directory, the amount of information of the index data is small compared to the amount of information related to the telephone number, family name, given name, corporate name and address which correspond to the dictionary data, and the information compression efficiency as a whole does not improve much even if the index data is compressed. For this reason, even if this proposed system is applied to the storage of the information of the dictionary, encyclopedia or the like, the information compression efficiency does not improve much for the dictionary file as a whole.

Therefore, in a case where the amount of information of the index data is relatively large even when compared to the amount of information of the dictionary data, as in the case of the dictionary, encyclopedia or the like, it was conventionally impossible to efficiently compress and store the dictionary file in the storage medium, and it was impossible to access the compressed dictionary file in a short time by a relatively simple process.

In view of the above, a method which divides the data and the index data with respect to the data into a plurality of sections and compresses the sections, has been proposed in an International Application (International Application No.PCT/JP98/04736, International Publication No. WO99/21092) which has been published according to the Patent Cooperation Treaty, for example. According to this proposed method, even in a case where the amount of information of the index data is relatively large compared to the amount of information of the dictionary data, as in the case of the dictionary, encyclopedia or the like, it is possible to efficiently compress and store the file such as the dictionary file in the storage medium, and it is possible to access the compressed dictionary file in a short time by a relatively simple process.

However, according to the conventional system or proposed method described above, the compression and expansion system employs the Huffman compression technique in order to carry out the retrieval at a high speed. In addition, a single compression parameter is used to compress the data. As a result, the following problems were generated.

First, when the Huffman compression technique is employed for the compression of the data of the dictionary, encyclopedia or the like, the number of words to be recorded in the storage medium becomes large, and there was a problem in that the data compression efficiency deteriorates as the number of kinds of words used for the comment increases.

In addition, there was a problem in that, even though the data is compressed, peculiar sections exist where the amount of information of the compressed data is larger than the amount of information of the non-compressed data.

Furthermore, because it is necessary to add an end information which indicates the end of the section to the end of each section of the data, there was a problem in that there is a limit to greatly improving the data compression efficiency as a whole.

On the other hand, when compressing a file made up of data other than the data of the dictionary, encyclopedia or the like, there are demands in the field of file systems and the like to similarly improve the data compression efficiency.

DISCLOSURE OF THE INVENTION

Accordingly, it is a general object of the present invention to provide a novel and useful file processing method, data processing apparatus and storage medium, in which the problems described above are eliminated.

Another and more specific object of the present invention is to provide a file processing method comprising a compressing step which divides a file into a plurality of sections and compresses each section of the file using a plurality of compression parameters; and a storing step which stores a compressed file in a storage medium. According to the present invention, it is possible to considerably improve the data compression efficiency.

A further object of the present invention is to provide a data processing apparatus comprising a compressing process section which divides a file into a plurality of sections and compresses each section of the file using a plurality of compression parameters; and a storing process section which stores a compressed file in a storage medium. According to the present invention, it is possible to considerably improve the data compression efficiency of the data processing apparatus.

Another object of the present invention is to provide a storage medium which stores computer-readable information, and stores a program comprising compressing process means for causing a computer to divide a file into a plurality of sections and compress each section of the file using a plurality of compression parameters; and storing process means for causing the computer to store a compressed file in storage means. According to the present invention, it is possible to considerably improve the data compression efficiency of the computer.

Still another object of the present invention is to provide a storage medium which stores computer-readable information, comprising a region storing a file which is divided into a plurality of sections which are compressed using a plurality of compression parameters; and a region storing the compression parameters. According to the present invention, it is possible to store a compressed file having a considerably improved data compression efficiency in the storage medium.

A further object of the present invention is to provide a storage medium further storing a driver software independent of an application software of a computer, where said driver software includes a program provided with expanding process means for causing the computer to expand the compressed file which is read from the storage medium. According to the present invention, there is no need to design the application software depending on each compression file, and the reading and expanding process with respect to the compressed file can be carried out using an existing application software by merely modifying the driver software.

Another object of the present invention is to provide a file processing method comprising a reading step which accesses a storage medium which stores a plurality of compression parameters and a compressed file, an original file being divided into a plurality of sections and compressed for each section using the plurality of compression parameters so as to obtain a plurality of section data forming the compressed file; and an expanding step which expands the section data read from the storage medium by said reading step using the compression parameters corresponding to the section data. According to the present invention, it is possible to satisfactorily expand the compressed file which is compressed at a high data compression efficiency by a relatively simple structure and process.

Still another object of the present invention is to provide a data processing apparatus comprising a reading process section which controls an access to a storage medium which stores a plurality of compression parameters and a compressed file, an original file being divided into a plurality of sections and compressed for each section using the plurality of compression parameters so as to obtain a plurality of section data forming the compressed file; and an expanding process section which expands the section data read from the storage medium by said reading process section using the compression parameters corresponding to the section data. According to the present invention, it is possible to satisfactorily expand the compressed file which is compressed at a high data compression efficiency by a relatively simple structure and process.

A further object of the present invention is to provide a data processing apparatus comprising a reading process section which controls an access to a storage medium which stores a plurality of compression parameters and a compressed file in response to a read request from an application software, an original file being divided into a plurality of sections and compressed for each section using the plurality of compression parameters so as to obtain a plurality of section data forming the compressed file; and an expanding process section which expands the section data read from the storage medium by said reading process section using the compression parameters corresponding to the section data, and supplies expanded data to the application software. According to the present invention, it is possible to satisfactorily expand the compressed file which is compressed at a high data compression efficiency by a relatively simple structure and process.

Another object of the present invention is to provide a storage medium which stores computer-readable information, and stores a program comprising reading process means for causing a computer to control an access to a recording medium which stores a plurality of compression parameters and a compressed file, an original file being divided into a plurality of sections and compressed for each section using the plurality of compression parameters so as to obtain a plurality of section data forming the compressed file; and expanding process means for causing the computer to expand the section data read from the recording medium by said reading process section using the compression parameters corresponding to the section data. According to the present invention, it is possible to satisfactorily expand the compressed file which is compressed at a high data compression efficiency by a relatively simple structure and process.

Still another object of the present invention is to provide a storage medium which stores computer-readable information, and stores a program comprising reading process means for causing a computer to control an access to a recording medium which stores a plurality of compression parameters and a compressed file in response to a read request from an application software, an original file being divided into a plurality of sections and compressed for each section using the plurality of compression parameters so as to obtain a plurality of section data forming the compressed file; and expanding process means for causing the computer to expand the section data read from the recording medium by said reading process section using the compression parameters corresponding to the section data, and supply expanded data to the application software. According to the present invention, it is possible to satisfactorily expand the compressed file which is compressed at a high data compression efficiency by a relatively simple structure and process.

Other objects and further features of the present invention will be apparent from the following detailed description when read in conjunction with the accompanying drawings.

BRIEF DESCRIPTION OF THE DRAWING

FIGS. 5A and 5B comprise a flow chart for explaining a compression parameter computing process;

BEST MODE OF CARRYING OUT THE INVENTION

A description will be given of a first embodiment of a file processing method and a data processing apparatus according to the present invention. This first embodiment of the file processing method and the data processing apparatus employs a first embodiment of a storage medium according to the present invention. In this first embodiment of the storage medium, the present invention is applied to a CD-ROM, but the storage medium itself is not limited to the CD-ROM, and the present invention is of course similarly applicable to storage media other than the CD-ROM, such as optical information storage media other than the CD-ROM, magneto-optical storage media such as magneto-optical disks, magnetic recording media such as floppy disks, and various kinds of semiconductor memory devices.

Figure 1:
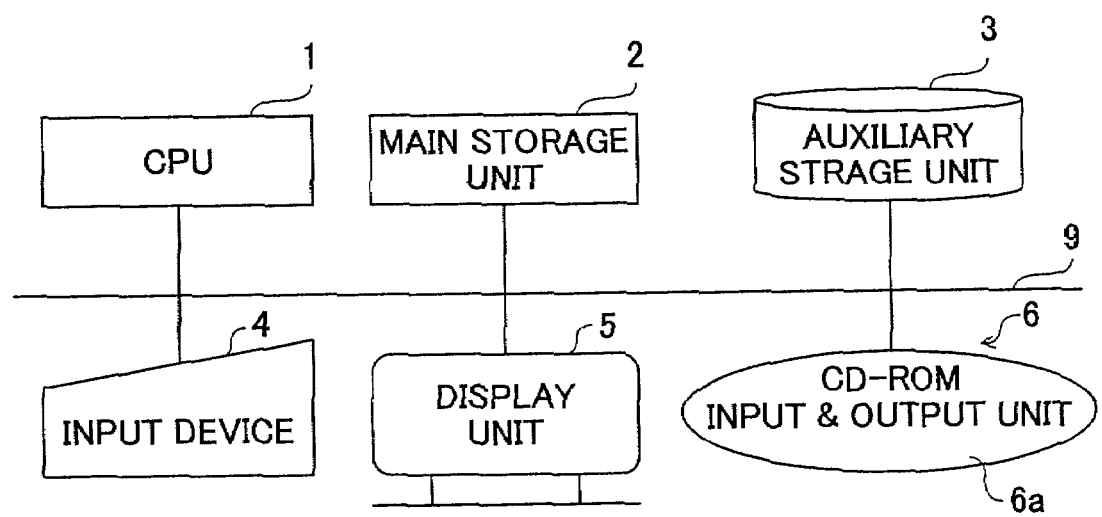
FIG. 1 is a system block diagram showing a general structure of a computer system which employs a first embodiment of a file processing method.

FIG. 1 is a system block diagram showing a general structure of a computer system applied with the first embodiment of the file processing method, and corresponds to the first embodiment of the data processing apparatus. The computer system shown in FIG. 1 generally includes a central processing unit (CPU) 1, a main storage unit 2 formed by a random access memory (RAM) or the like, an auxiliary storage unit 3 formed by a hard disk drive or the like, an input device 4 formed by a keyboard, mouse or the like, a display unit 5, and a CD-ROM input and output unit 6 which is formed by a CD-ROM drive or the like, and these elements of the computer system are coupled via a bus 9. Each of the elements itself forming the computer system may be formed by known structures.

The input device 4 is used to input instructions and data to the CPU 1. The CPU 1 carries out processes requested by a user, by executing programs stored in the auxiliary storage unit 3 based on the instructions and data which are input. The programs stored in the auxiliary storage unit 3 may be installed in advance or, may be loaded from a CD-ROM 6a which is loaded into the CD-ROM input and output unit 6. The main storage unit 2 is used to temporarily store intermediate results of computing processes or the like carried out by the CPU 1, data used by the computations and the like. The display unit 5 displays results of processes carried out by the CPU 1, messages for urging the user to input instruction and data, and the like. It is also possible to connect a printer (not shown) to the bus 9, in place of the display unit 5 or, in addition to the display unit 5, so as to print the results of the processes carried out by the CPU 1 and the like.

First, a description will be given of a file storing process for storing a dictionary file of a dictionary, encyclopedia or the like in a CD-ROM 6a which is loaded into the CD-ROM input and output unit 6. The file storing process generally includes a compression parameter computing process, a data compressing process for index, text or the like, an address information computing process, a compressed file combining process, and a compressed file storing process. It is assumed for the sake of convenience in this embodiment that the CD-ROM 6a stores a program for causing the CPU 1 to carry out the file storing process, and that the CPU 1 reads this program from the CD-ROM 6*a* by a known method and loads the read program into the auxiliary storage unit 3. In addition, it is assumed that the dictionary file of the dictionary, encyclopedia or the like is transferred from a host unit (not shown) and stored in the auxiliary storage unit 3 via the bus 9 or, read from a CD-ROM different from the CD-ROM 6*a* by the CD-ROM input and output unit 6 and stored in the auxiliary storage unit 3 via the bus 9.

Figure 2:
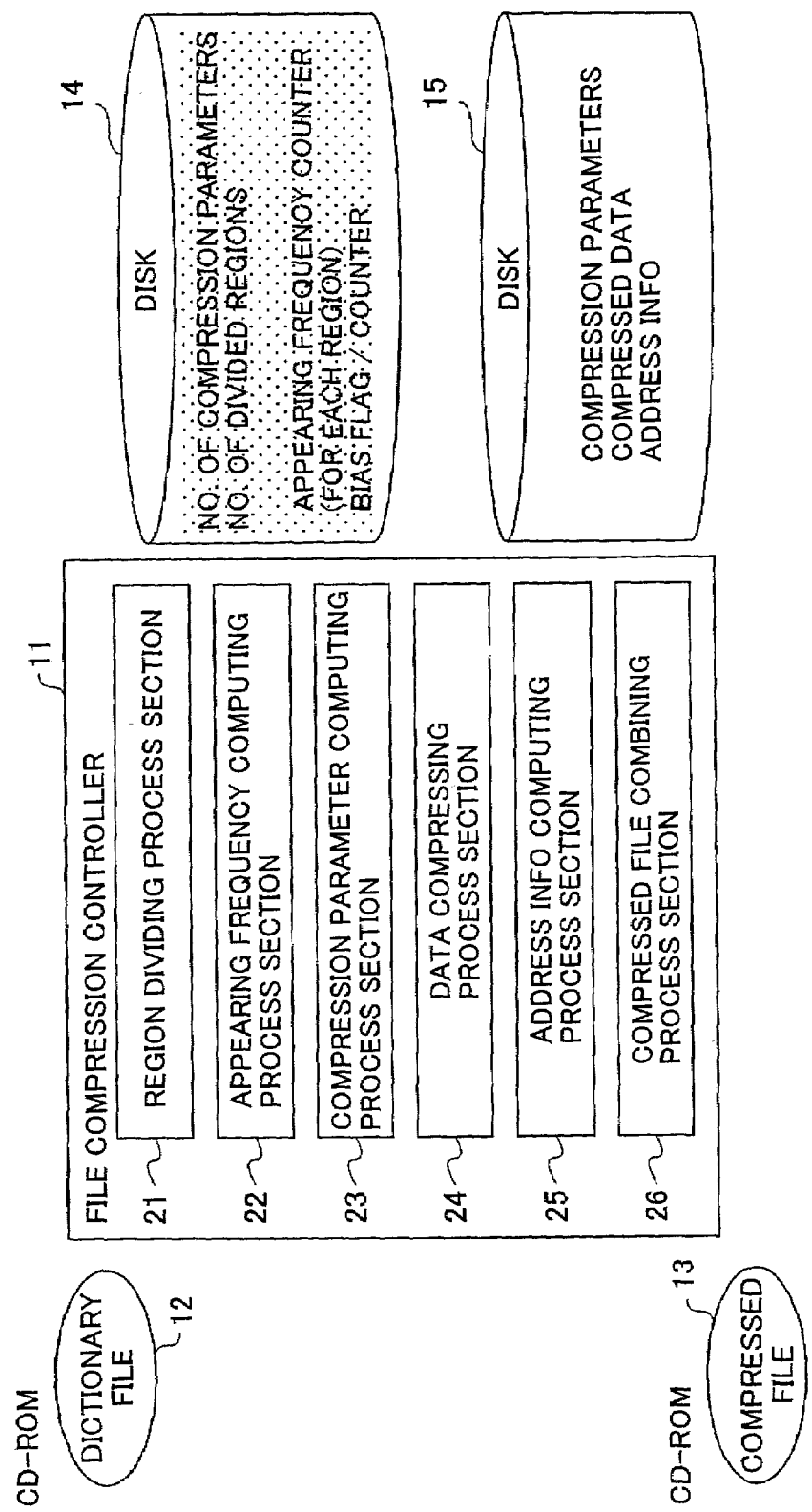
FIG. 2 is a functional block diagram showing a file compression system formed by a first embodiment of a data processing apparatus.

FIG. 2 is a functional block diagram showing a file compression system formed by the first embodiment of the data processing apparatus. In FIG. 2, those parts which are the same as those corresponding parts in FIG. 1 are designated by the same reference numerals, and a description thereof will be omitted.

The file compression system shown in FIG. 2 generally includes a file compression controller 11, a dictionary file 12 electronically published in CD-ROM, a compressed file 13, and data files 14 and 15. The file compression controller 11 is formed by the CPU 1 shown in FIG. 1, and includes a region dividing process section 21, an appearing frequency computing process section 22, a compression parameter computing process section 23, a data compressing process section 24, an address information computing process section 25, and a compressed file combining process section 26. In this embodiment, the dictionary file 12 and the compressed file 13 are formed by the CD-ROM 6*a*, for example, and the data files 14 and 15 are formed by the auxiliary storage unit 3, for example.

The region dividing process section 21 divides the dictionary file 12 into a plurality of regions, and stores the number of divided regions in the data file 14. The appearing frequency computing process section 22 obtains the appearing frequency of the character in each region of the dictionary file 12 by computation, and stores a region and appearing frequency count in the data file 14. In addition, the appearing frequency computing section 22 obtains a bias of the character in each region by computation, and stores a bias flag, a bias count and the like in the data file 14. For example, the number of divided regions is set to ten-odd times the number of compression parameter types used for the compression.

The compression parameter computing process section 23 obtains a plurality of compression parameters for each region of the dictionary file 12 by computation, and stores the compression parameters in the data file 15. The data compressing process section 24 compresses the data of the dictionary file 12 based on each of the compression parameters, and stores the compressed data in the data file 15. The address information computing process section 25 generates address information for each region of the dictionary file 12, and stores the address information in the data file 15. The compressed file combining process section 26 generates a compressed file by combining the data stored in the data files 14 and 15, and stores the compressed file in the compressed file 13.

Figure 3:
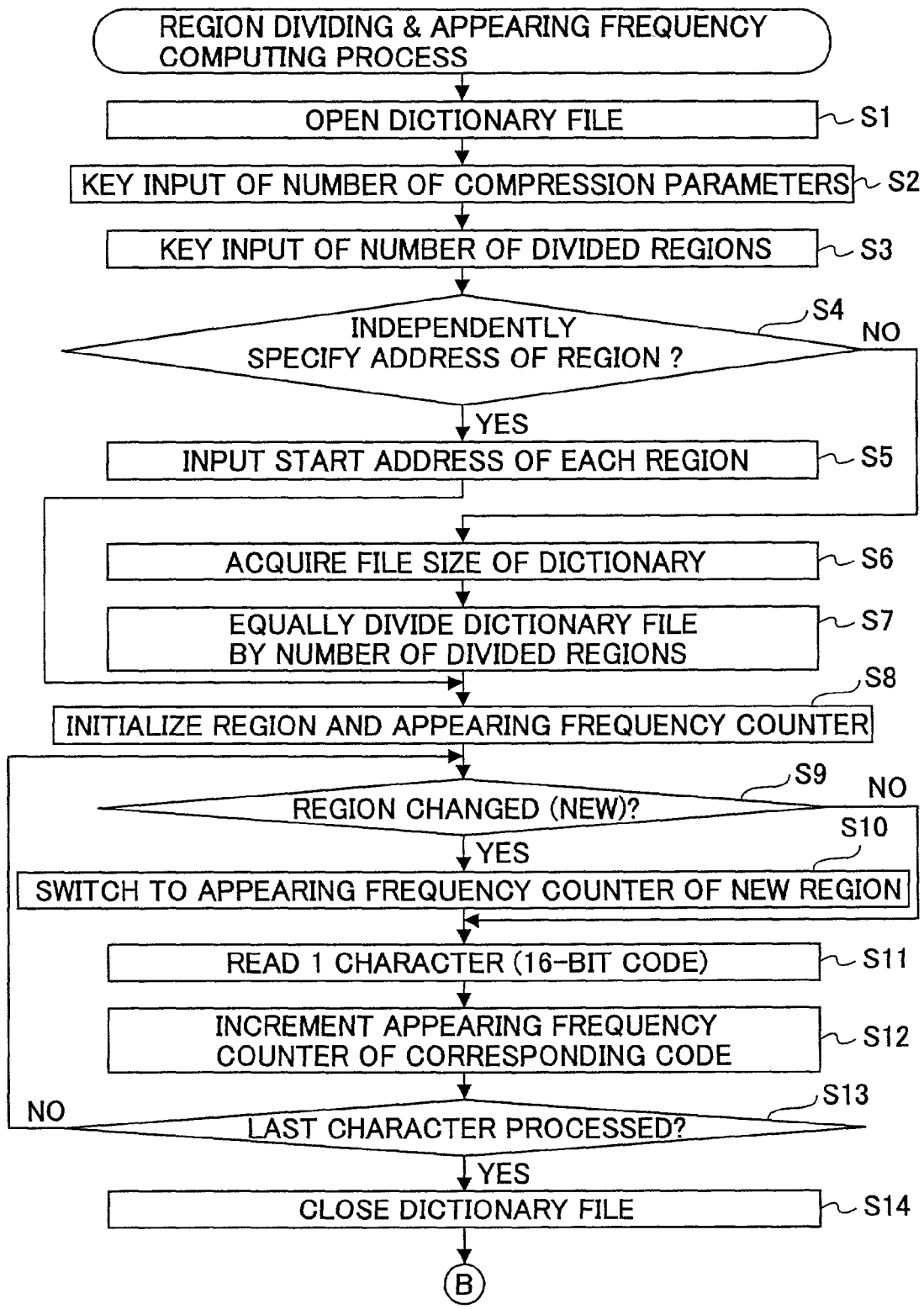
FIGS. 3A and 3B comprise a flow chart for explaining a region dividing process and an appearing frequency computing process.
Figure 4:
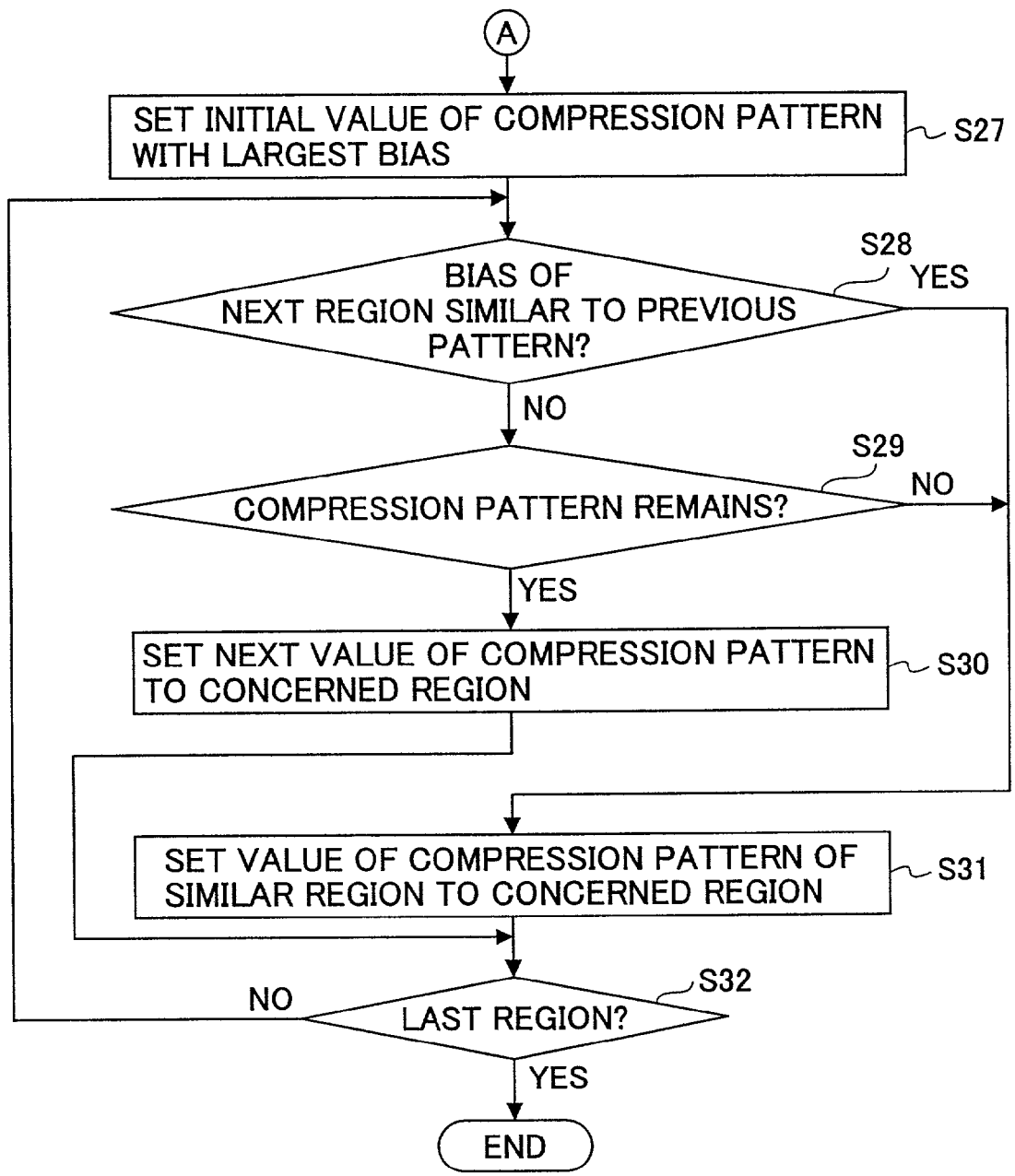
FIG. 4 is a flow chart for explaining the region dividing process and the appearing frequency computing process.

1a) Region Dividing Process and Appearing Frequency Computing Process:

FIGS. 3A, 3B and 4 are flow charts for explaining a region dividing process and an appearing frequency computing process which is carried out by the file compression controller 11, the region dividing process section 21 and the appearing frequency computing process section 22, that is, the process of the CPU 1.

In FIGS. 3A and 3B, a step S1 accesses the CD-ROM 6*a* and opens the dictionary file 12, and a step S2 inputs the number of compression parameters which are input from the input device 4 by manipulating keys thereof. A step S3 inputs a number of divided regions of the dictionary file 12 which are input from the input device 4 by manipulating keys thereof. A step S4 decides whether or not an address of the region is to be specified independently. The process advances to a step S5 if the decision result in the step S4 is YES, and the process advances to a step S6 if the decision result in the step S4 is NO. The step S5 inputs a start address for each region, and the process advances to a step S8.

The step S6 acquires a file size of the dictionary file 12, and a step S7 equally divides the dictionary file 12 into the number of divided regions. After the step S7 or S5, the step S8 initializes a region and appearing frequency count of a region and appearing frequency counter within the CPU 1. A step S9 decides whether or not the region is changed and the process advanced to a new region. The process advances to a step S10 if the decision result in the step S9 is YES, and the process advances to a step S11 if the decision result in the step S9 is NO. The step S10 switches the region and appearing frequency counter to a region and appearing frequency counter of the new region.

After the step S10 or, if the decision result in the step S9 is NO, the step S11 reads a 16-bit code corresponding to one character from the dictionary file 12. In addition, a step S12 increments the appearing frequency count of the appearing frequency counter of the corresponding code. A step S13 decides whether or not the last character of the dictionary file 12 is processed. The process returns to the step S9 if the decision result in the step S13 is NO, and the process advances to a step S14 to close the dictionary file 12 if the decision result in the step S13 is YES.

A step S15 sorts one character in an order depending on the appearing frequency for each of the divided regions, and a step S16 selects 1024 characters in the order of the appearing frequency, for example. A step S17 initializes to the character having the highest appearing frequency in the first divided region, and a step S18 calculates a bias of the appearing frequency by comparing the appearing frequency of the concerned character in another region and the appearing frequency of the concerned character in the first divided region. A step S19 decides whether or not a character with the biased appearing frequency exists. The process advances to a step S20 if the decision result in the step S19 is YES, and the process advances to a step S22 if the decision result in the step S19 is NO.

The step S20 sets a bias flag for each character of each divided region, and a step S21 counts up a bias counter of a bias counter for each divided region. If the decision result in the step S19 is NO or, after the step S21, the step S22 switches to the character having the next appearing frequency. A step S23 decides whether or not the 1024th character is exceeded, and the process returns to the step S18 if the decision result in the step S23 is NO. On the other hand, if the decision result in the step S23 is YES, a step S24 switches to the next divided region, and a step S25 decides whether or not the last divided region is exceeded. If the decision result in the step S25 is YES, a step S26 sorts each of the divided regions based on the bias count, and the process advances to a step S27 shown in FIG. 4.

In FIG. 4, the step S27 sets an initial value of a compression pattern of the divided region having the largest bias. A step S28 decides whether or not the bias of the next divided region is similar to the previous compression pattern. If the decision result in the step S28 is NO, a step S29 decides whether or not a compression pattern remains. If the decision result in the step S29 is YES, a step S30 sets a next value of the compression pattern for the concerned divided region.

On the other hand, if the decision result in the step S28 is YES or, the decision result in the step S29 is NO, a step S31 sets a value of the compression pattern of the divided region which is similar to the concerned divided region. After the step S30 or S31, a step S32 decides whether or not the last divided region is reached. The process returns to the step S28 if the decision result in the step S32 is NO, and the process ends if the decision result in the step S32 is YES.

Figure 5:
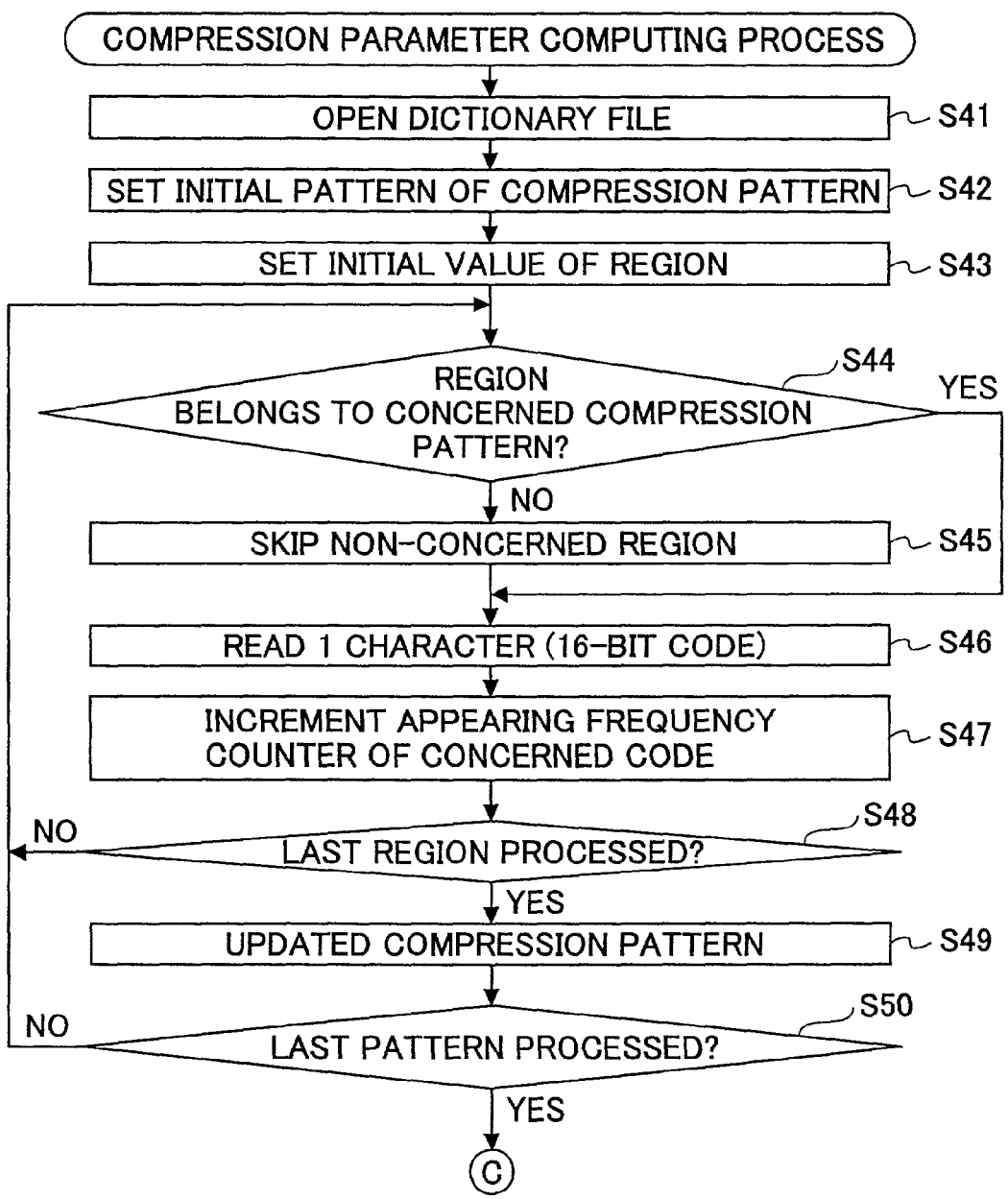
FIG. 5 is a flow chart.

1b) Compression Parameter Computing Process:

FIG. 5 is a flow chart for explaining a compression parameter computing process of the file compressing controller 11 and the compression parameter computing process section 23, that is, the process of the CPU 1.

In FIG. 5, a step S41 accesses the CD-ROM 6a and opens the dictionary file. A step S42 sets an initial value of the compression pattern, and a step S43 sets an initial value of the divided region. A step S44 decides whether or not the divided region which is to be processed belongs to the concerned compression pattern. The process advances to a step S46 if the decision result in the step S44 is YES, and the process advances to a step S45 if the decision result in the step S44 is NO. The step S45 skips a non-concerned divided region.

The step S46 reads the 16-bit code corresponding to one character. A step S47 increments the appearing frequency count of the appearing frequency counter of the concerned 16-bit code, and a step S48 decides whether or not the last divided region is processed. The process returns to the step S44 if the decision result in the step S47 is NO. If the decision result in the step S48 is YES, a step S49 updates the compression pattern. A step S50 decides whether or not the last compression pattern is processed, and the process returns to the step S44 if the decision result in the step S50 is NO.

On the other hand, if the decision result in the step S50 is YES, a step S51 sets an initial value of the compression pattern, and a step S52 initializes the divided region which uses the compression parameters of the concerned compression pattern. A step S53 sorts the 16-bit codes depending on the order of the appearing frequency, and a step S54 selects 1024 16-bit codes in the order of the appearing frequency. A step S55 decomposes the remaining 16-bit codes into 8-bit codes, and calculates the appearing frequency thereof. A step S56 makes the appearing frequency of the 8-bit codes to approximately ½, so as to make a correction with respect to the 16-bit codes.

A step S57 accesses the auxiliary storage unit 3, for example, and opens a save file of the compression parameters into the data file 15. A step S58 writes 1024 16-bit codes and the appearing frequencies thereof in the compression parameter save file within the data file 15. In addition, a step S59 writes 256 8-bit codes and the appearing frequencies thereof in the compression parameter save file within the data file 15. A step S60 closes the compression parameter save file within the data file 15, and a step S61 updates the compression pattern. A step S62 decides whether or not the last compression pattern is processed, and the process returns to the step S52 if the decision result in the step S62 is NO, and the process ends if the decision result in the step S62 is YES.

Figure 6:
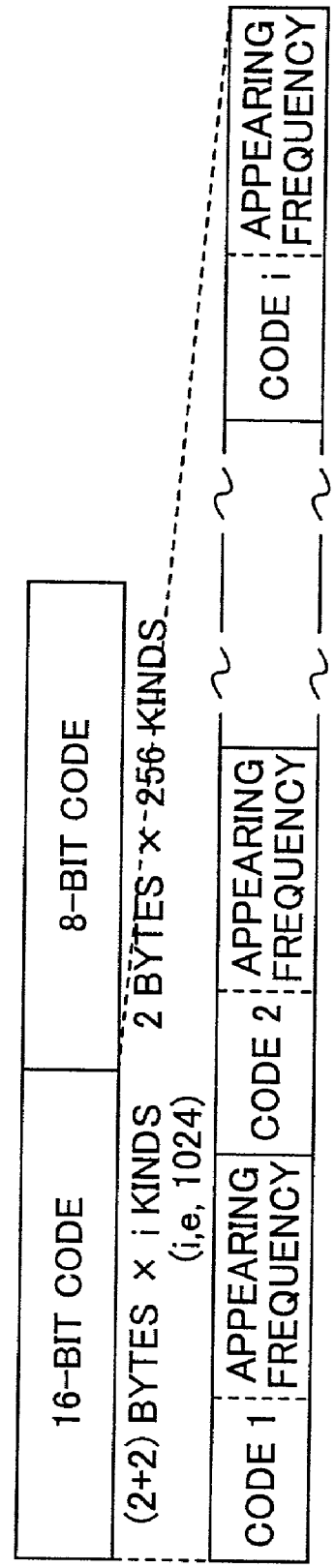
FIG. 6 is a diagram showing a data structure of the compression parameters.

FIG. 6 is a diagram showing a data structure of the compression parameters. In the case of the compression using the Huffman code, each compression parameter includes 256 kinds of appearing frequencies for each of 1024 kinds of 16-bit codes, and 256 kinds of appearing frequencies for each 8-bit code, for example. These appearing frequencies become the data which are used to generate a Huffman tree. In the case of the compression using the Universal code, the compression parameters are formed by a try tree or data such as registered codes and reference numbers thereof for generating the try tree.

Figure 7:
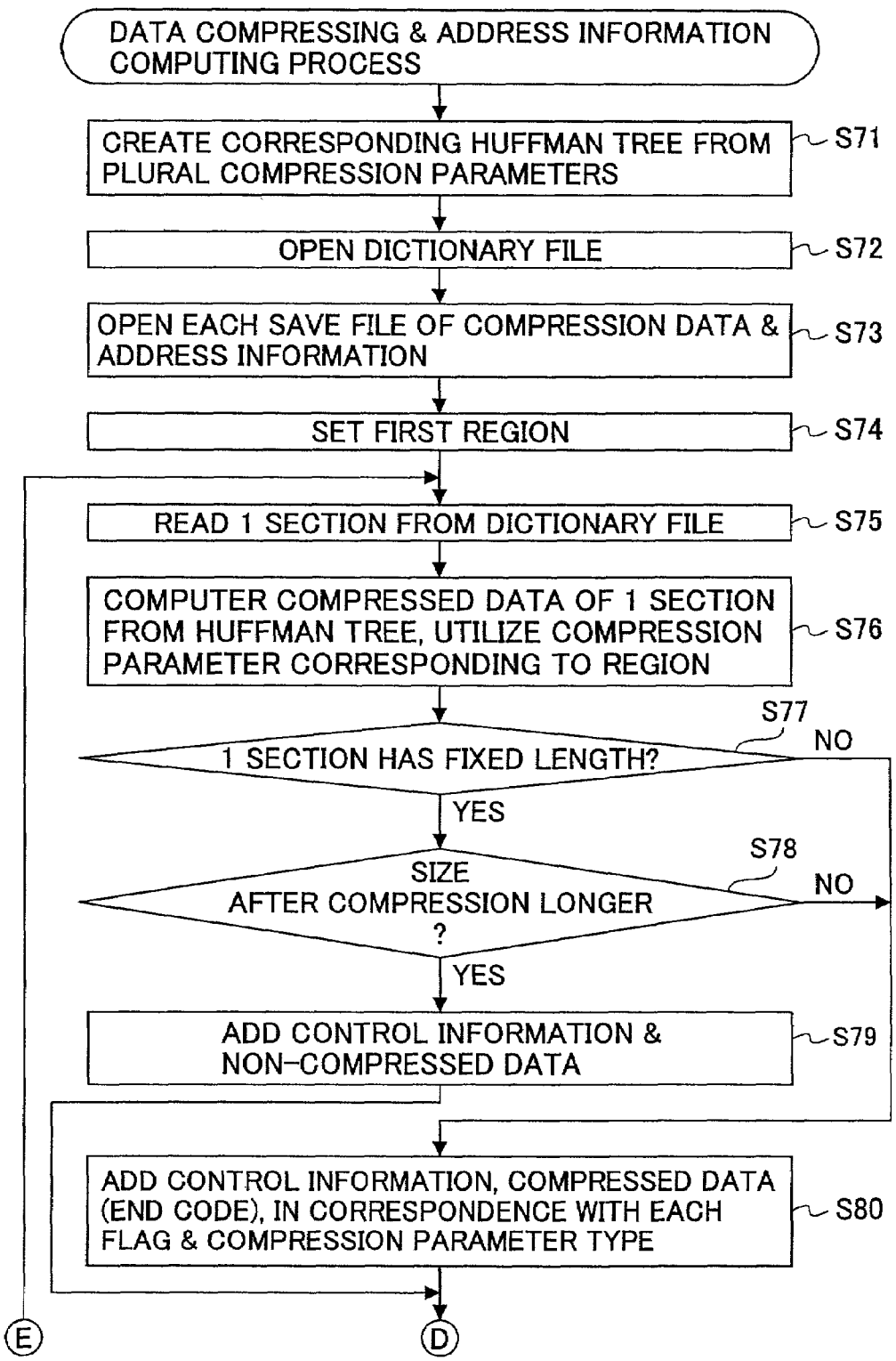
FIGS. 7A and 7B comprise a flow chart for explaining a data compressing process and an address information computing process.

1c) Data Compressing Process And Address Information Computing Process:

FIG. 7 is a flow chart for explaining a data compressing process and an address information computing process of the data compressing process section 24 and the address information computing process section 25 within the file compression controller 11, that is, the process of the CPU 1.

In FIG. 7, a step S71 creates a conversion table from the plurality of compression parameters, that is, creates a Huffman tree since the Huffman compression is carried out in this embodiment. A step S72 opens the dictionary file 12 by accessing the CD-ROM 6a. A step S73 opens a compressed data save file and an address information save file within the data file 15 by accessing the auxiliary storage unit 3. A step S74 sets the first divided region.

A step S75 reads one section from the dictionary file 12. This section may have a fixed length or a variable length, but for the sake of convenience, it is assumed in this embodiment that this section has a variable length. This section is also sometimes referred to as a block. A step S76 computes the compressed data of one section using the Huffman tree. A step S77 decides whether or not one section has a fixed length, and the process advances to a step S80 if the decision result in the step S77 is NO. On the other hand, if the decision result in the step S77 is YES, a step S78 decides whether or not a size of the compressed data is longer than a size of the non-compressed data before the compression, and the process advances to the step S80 if the decision result in the step S78 is NO. If the decision result in the step S78 is YES, a step S79 generates control information which includes a non-compression flag indicating that the data is a non-compressed data, and the non-compressed data, and the process advances to a step S81. In this case, if the section is a last section, end information (EOB: End Of Block) is added to the end of the section. If the section is an intermediate section other than the last section, an EOB delete flag indicating that the EOB is deleted is included in the control information, instead of adding the EOB.

The step S80 generates the control information, the compressed data, the EOB and the like in correspondence with each flag and the compression parameter type, and the process advances to the step S81. In this case, if the section is the last section, the EOB is added to the end of the section. If the section is an intermediate section other than the last section, the EOB delete flag indicating that the EOB is deleted is included in the control information, instead of adding the EOB. The step S81 writes the compressed data in the compressed data save file within the data file 15.

A more detailed description will be given later with respect to the control information, the EOB and the like, by referring to FIGS. 9 and 10.

A step S82 computes the address information of the location where the concerned section is stored. For example, in the case where the section has the fixed length, the address information is computed based on a section number which is given to each section. A step S83 writes the address information in the address information save file within the data file 15. A step S84 decides whether or not the last section of the concerned divided region is processed, and the process returns to the step S75 if the decision result in the step S84 is NO. For example, whether or not the last section is processed may be judged based on the section number or a last section code which is added to the section number of the last section.

On the other hand, if the decision result in the step S84 is YES, a step S85 updates the divided region, and a step S86 decides whether or not the last section of the dictionary file 12 is processed. The process returns to the step S75 if the decision result in the step S86 is NO, and the process advances to a step S87 if the decision result in the step S86 is YES. The step S87 closes the compressed data save file and the address information save file. In addition, a step S88 closes the dictionary file 12, and the process ends.

Figure 8:
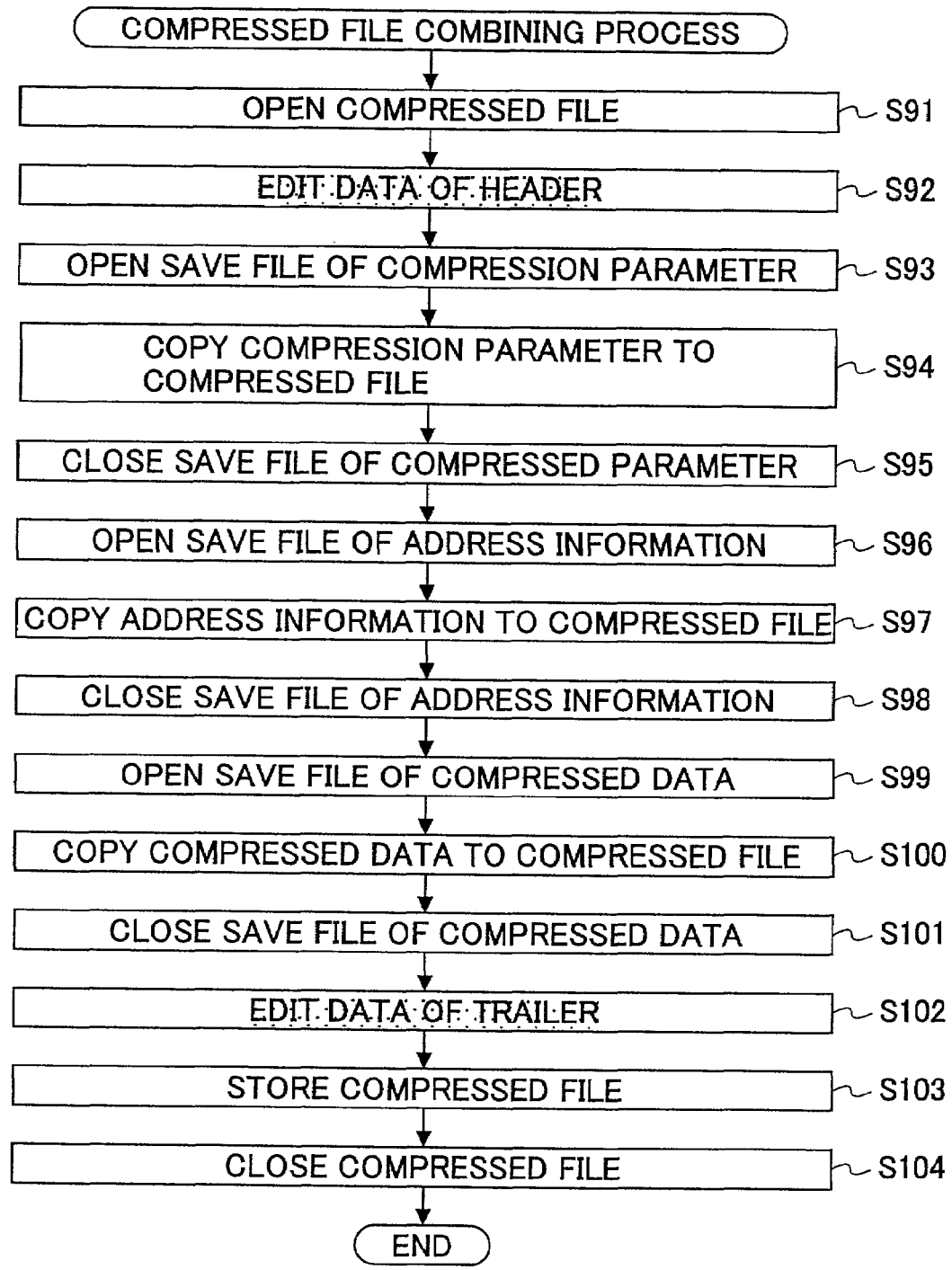
FIG. 8 is a flow chart for explaining a compressed file combining process.

1d) Compressed File Combining Process:

FIG. 8 is a flow chart for explaining a compressed file combining process of the compressed file combining process section 26 within the file compression controller 11, that is, the process of the CPU 1.

In FIG. 8, a step S91 opens the compressed file 13. A step S92 edits data of a header for identifying the start of the compressed file. A step S93 opens the compression parameter save file within the data file 15 of the auxiliary storage unit 3, and a step S94 copies the compression parameters of the compression parameter save file into the compressed file 13. A step S95 closes the compression parameter save file.

A step S96 opens the address information save file within the data file 15 of the auxiliary storage unit 3, and a step S97 copies the address information of the address information save file into the compressed file 13. A step S98 closes the address information save file. Further, a step S99 opens the compressed data save file within the data file 15 of the auxiliary storage unit 3, and a step S100 copies the compressed data of the compressed data save file into the compressed file 13. A step S101 closes the compressed data save file. A step S102 edits the data of a trailer for identifying an end of the compressed file, and a step S103 stores the compressed file 13 in the CD-ROM 6a. In addition, a step S104 closes the compressed file 13, and the process ends.

Figure 9:
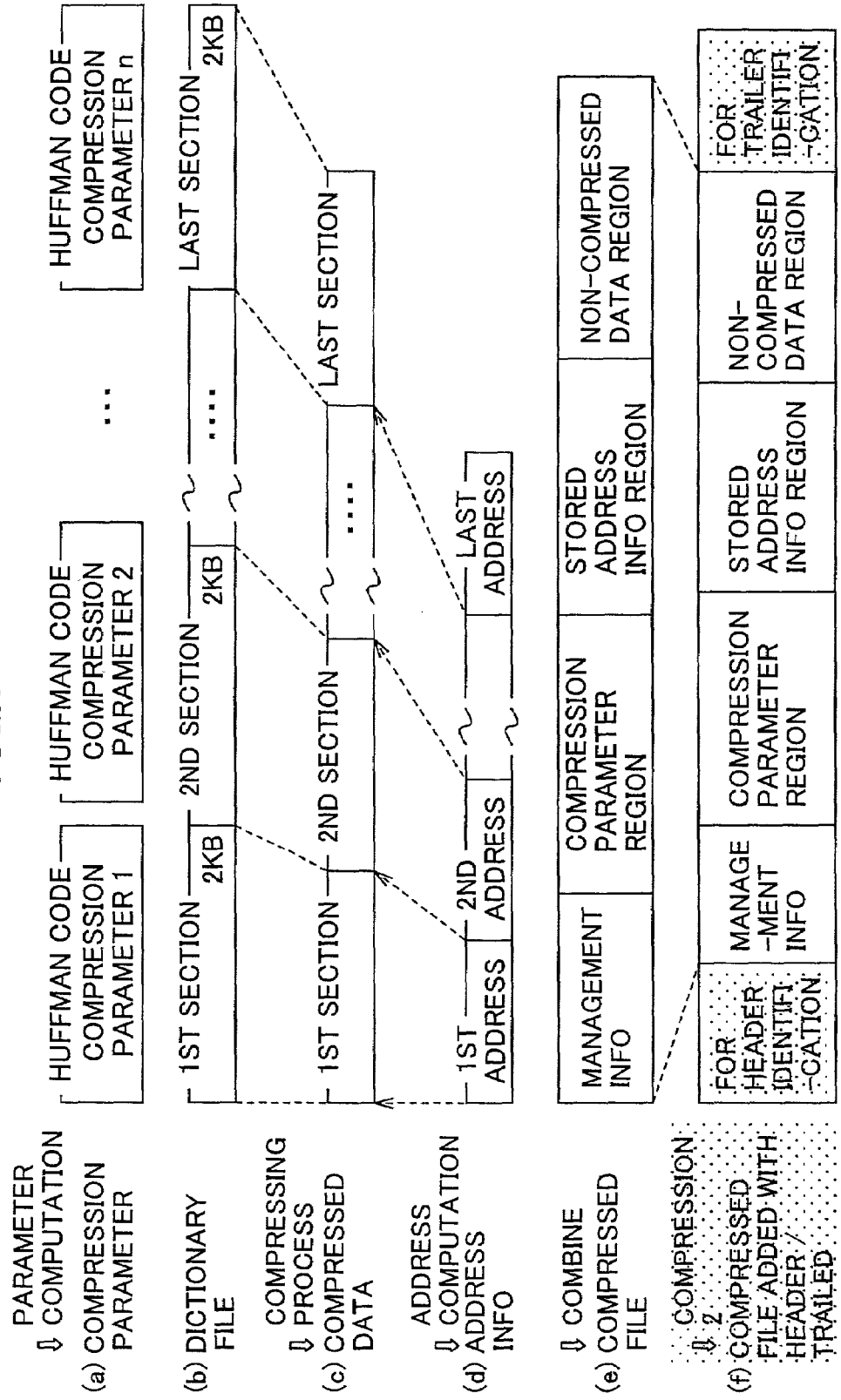
FIG. 9 is a diagram for explaining combining of compressed files.

FIG. 9 is a diagram for explaining combining of the compressed files by the 1a) region dividing process and appearing frequency computing process, 1b) compression parameter computing process, 1c) data compressing process and address information computing process, and 1d) compressed file combining process described above. In FIG. 9, (a) shows the compression parameters, and in this embodiment, the compression parameters are for carrying out the compression by the Huffman coding. In FIG. 9, (b) shows the sections of the dictionary file, and in this embodiment, each section is made up of 2 kbytes, for example, and each section is formed by dictionary data and index data. In the case of an encyclopedia, for example, the dictionary data includes text data of text describing the meanings of words, image data of an animal if the word relates to the animal, for example, and audio data indicating a chirping sound of a bird if the word relates to a bird, for example. The index is used to retrieve a desired dictionary data from the dictionary file, and is provided with respect to each dictionary data. The index is sometimes referred to as a keyword. The index data includes a catchword pointer, an item pointer and the like. Data of the catchword include a headword. Data of the item includes a headword, comment and the like.

In FIG. 9, (c) shows the compressed data in a state where each section is compressed by variable-length compression. In addition, in FIG. 9, (d) shows the address information which is computed with respect to each section, and (e) shows the compressed file which is obtained by combining the compression parameters, the address information and the compressed data and adding management information at the start. The management information includes information which is used when retrieving the compressed file, such as a dictionary file name, a dictionary file type, and a compression type of the dictionary file. Further, in FIG. 9, (f) shows the compressed file which is added with a header and a trailer.

Figure 10:
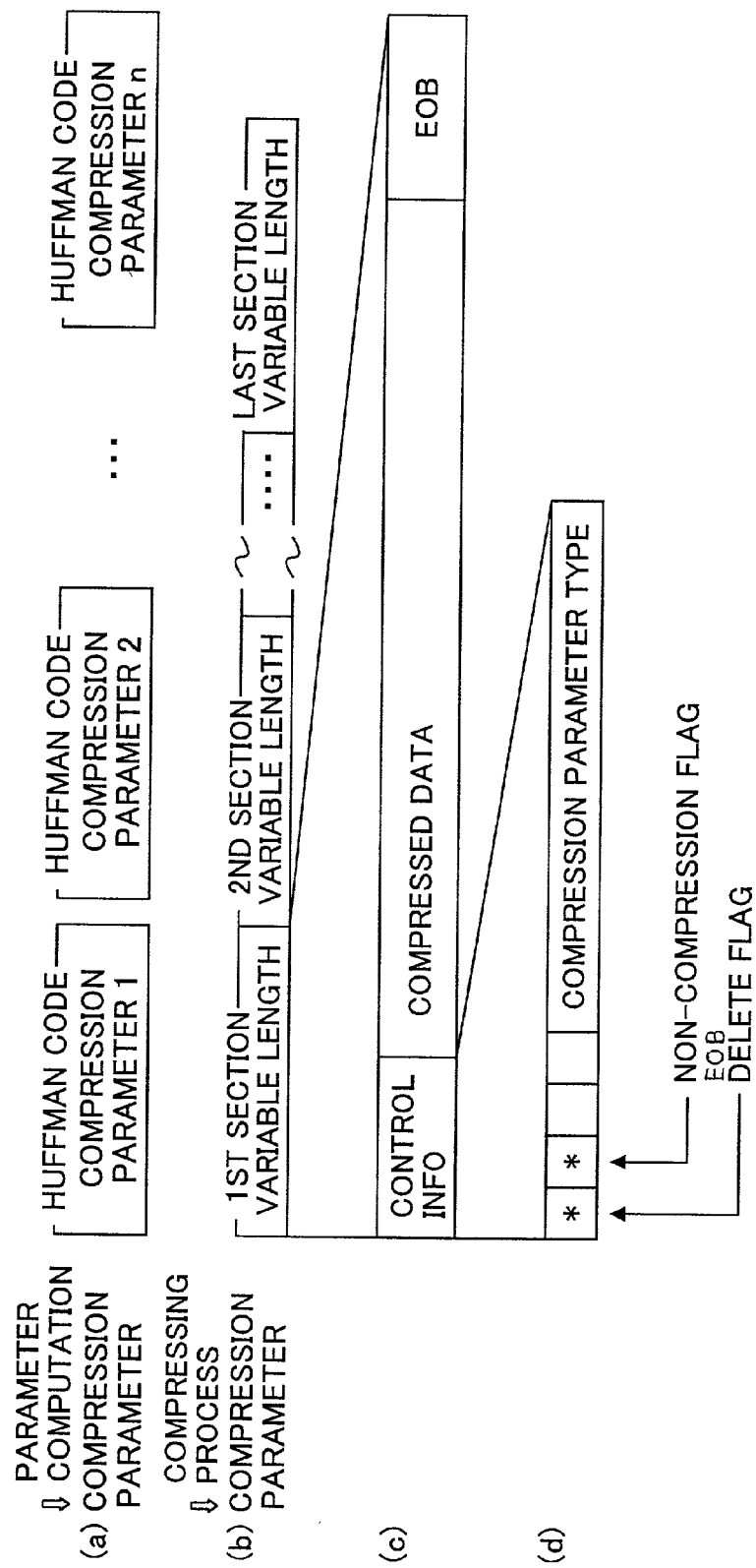
FIG. 10 is a diagram for explaining a format of compressed data.

FIG. 10 is a diagram for explaining a format of compressed data within the compressed file. In FIG. 10, (a) shows the compression parameters, and in this embodiment, the compression parameters are for carrying out the compression by the Huffman coding. In addition, in FIG. 10, (b) shows the compressed data in a state where each section is compressed by variable-length compression. In FIG. 10, (c) shows the control information, the compressed data and the EOB which form each section. In FIG. 10, (d) shows the control information which includes an EOB delete flag, a non-compression flag, the compression parameter type and the like.

The EOB which indicates the end of each section is made up of 18 bits to 24 bits. However, when each section has a fixed length, the EOB may be omitted with respect to the sections other than the last section. Hence, in order to further improve the data compression efficiency, the EOB delete flag is provided to indicate whether or not the EOB is deleted.

In a peculiar section where a large number of words having a low appearing frequency exist, a phenomenon is encountered wherein the compressed data becomes longer than the non-compressed data. Accordingly, in such a case, the non-compressed data is stored in the compressed file in place of the compressed data as described above, in order to further improve the data compression efficiency. The non-compression flag indicates whether or not the non-compressed data is stored in place of the compressed data.

The compression parameter type (or compression parameter identification number) is used for the compression of the concerned section, and indicates one of n compression parameter types 1 through n. Hence, it is possible to know the compression parameters which are used for the compression of each section from the control information which is provided at the start of each section.

Figure 11:
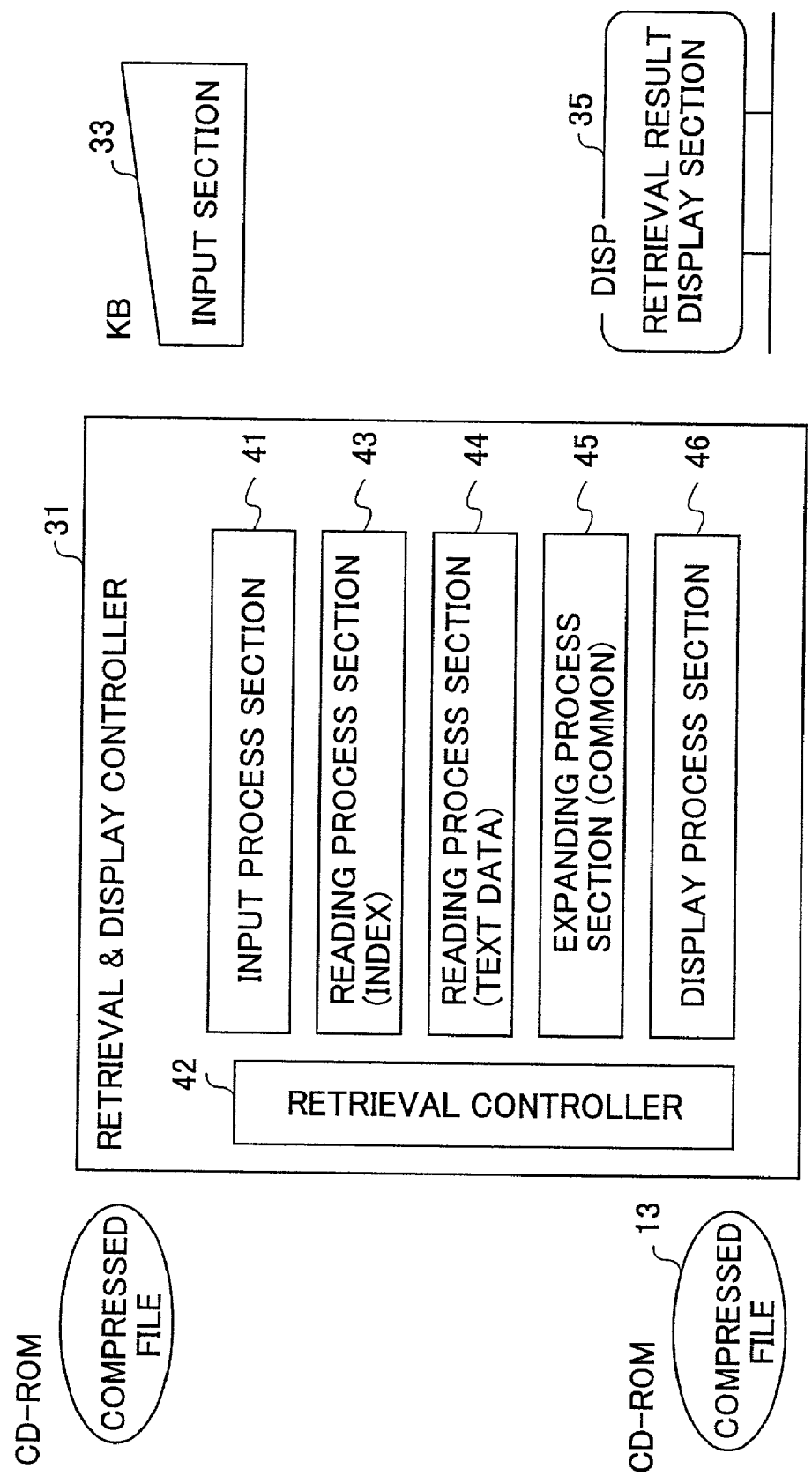
FIG. 11 is a functional block diagram showing a file retrieval and display system formed by the first embodiment of the data processing apparatus.

FIG. 11 is a functional block diagram showing a file retrieval and display system formed by this first embodiment of the data processing apparatus. In FIG. 11, those parts which are the same as those corresponding parts in FIG. 1 are designated by the same reference numerals, and a description thereof will be omitted.

The file retrieval and display system shown in FIG. 11 generally includes a retrieval and display controller 31, the compressed file 13, an input section 33, and a retrieval result display section 35. The retrieval and display controller 31 is formed by the CPU 1 shown in FIG. 1, and includes an input process section 41, a retrieval controller 42, read process sections 43 and 44, an expanding process section 45, and a display process section 46. The compressed file is formed by the CD-ROM 6a shown in FIG. 1, for example. The input section 33 is formed by the input device 4 shown in FIG. 1. Moreover, the retrieval result display section 35 is formed by the display unit 5 shown in FIG. 1.

The contents and control sequence of each process is determined by the input process section 41 and the retrieval controller 42, based on the retrieval mode, keyword and the like which are input from the input section 33. The index pointer corresponding to the index data input from the input section 33, is read from the compressed file 13 by the read process section 43, and the data of the index pointer is expanded by the expanding process section 45. The text data of the concerned text is read by the read process section 44 based on the value of the acquired index pointer, and the text data of the text is expanded by the expanding process section 45. A retrieval result which is obtained by the series of retrieval processes described above is displayed on the retrieval result display section 35 by the display process section 46.

Next, a description will be given of a file retrieval and display process which retrieves and displays the desired data by reading the compressed file 13 stored in the CD-ROM 6a which is loaded into the CD-ROM input and output unit 6. The file retrieval and display process generally includes an index read process and a text read process, and carries out a data expanding process by calling the data expanding process. In this embodiment, it is assumed for the sake of convenience that a program for causing the CPU 1 to carry out the file retrieval and display process is stored in the CD-ROM 6a, and that the CPU 1 reads this program and the compressed file from the CD-ROM 6a by a known method and loads the read program and compressed file into the auxiliary storage unit 3.

Figure 12:
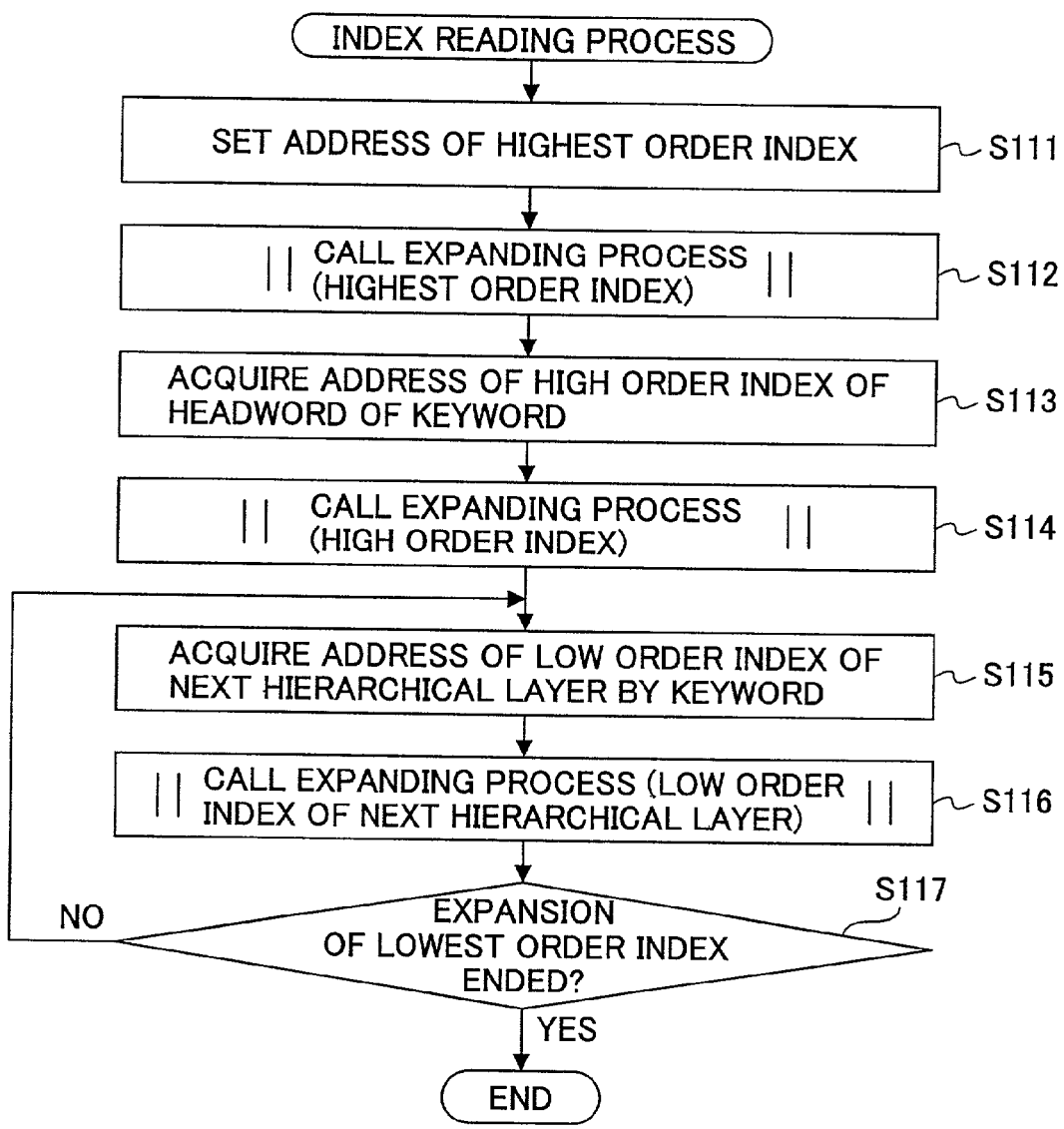
FIG. 12 is a flow chart for explaining an index reading process.

2a) Index Read Process:

FIG. 12 is a flow chart for explaining an index reading process of the read process section 43 and the expanding process section 45 within the retrieval and display controller 31, that is, the process of the CPU 1 shown in FIG. 1. In FIG. 12, a step S111 sets the address information of a highest order index, based on the index data which is input by the user from the input section 33. A step S112 calls the data expanding process, and reads a routine for causing the data expanding process to be carried out from the program which is stored in the auxiliary storage unit 3 and causes the file retrieval process to be carried out, so as to expand the address of the highest order index within the compressed file 13. A step S113 acquires the address of the high order index which is the first letter of highest order index, based on the above described index data. A step S114 calls the data expanding process, and expands the address of the high order index within the compressed file 13. A step S115 acquires the address of a low order index of the next hierarchical layer, based on the above described index data. A step S116 calls the data expanding process, and expands the address of the low order index of the next hierarchical layer within the compressed file 13. A step S117 decides whether or not the expansion of the address of a lowest order index ended, and the process returns to the step S115 if the decision result in the step S117 is NO. On the other hand, the process ends if the decision result in the step S117 is YES.

Figure 13:
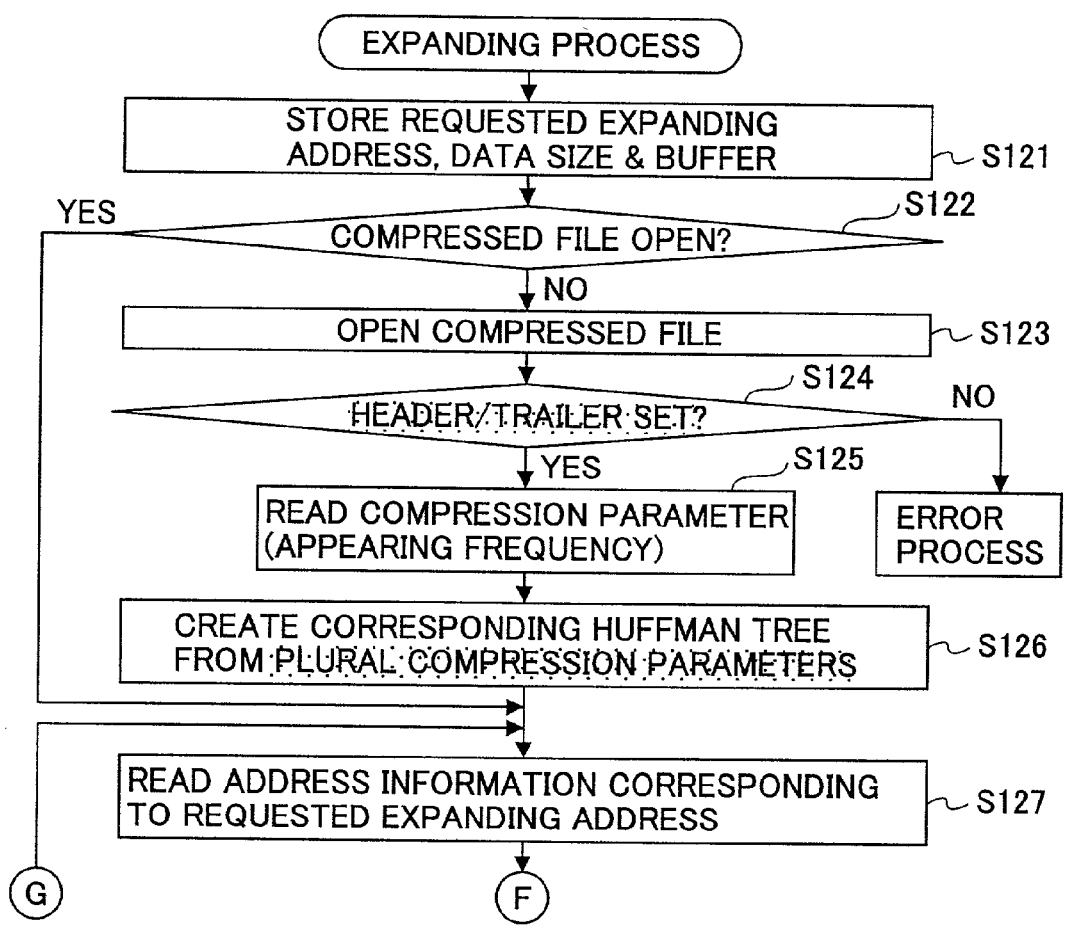
FIGS. 13A and 13B comprise a flow chart for explaining a data expanding process.

2b) Data Expanding Process:

FIGS. 13A and 13B comprise a flow chart for explaining a data expanding process of the expanding process section 45 within the retrieval and display controller 31, that is, the process of the CPU 1 shown in FIG. 1. The data expanding process is called by the index read process and the text read process.

In FIGS. 13A and 13B, a step S121 stores a requested expanding address, data size and storage region in the auxiliary storage unit 3, based on the index data which is input by the user from the input section 33, so as to prepare within the auxiliary storage unit 3 a storage region having a sufficiently large size with respect to the expanded data size. A step S122 decides whether or not the compressed file 13 which is read from the CD-ROM 6a and loaded into the auxiliary storage unit 3 is opened. If the decision result in the step S122 is NO, a step S123 opens the compressed file 13 within the auxiliary storage unit 3. A step S124 decides whether or not the header and the trailer are set, and the process advances to a known error process if the decision result in the step S124 is NO.

On the other hand, if the decision result in the step S124 is YES, a step S125 reads the compression parameters from the compressed file 13, and reads the appearing frequency of the 8-bit code, the 16-bit codes, and the appearing frequencies of the 16-bit codes. A step S126 creates a corresponding Huffman tree with respect to each of the plurality of compression parameters, based on the appearing frequency of the 8-bit code, the 16-bit codes and the appearing frequencies of the 16-bit codes, and the process advances to a step S127 which will be described later. A judging flag for judging whether the code is the 8-bit code or the 16-bit code is added to the data of the leaf of the Huffman tree.

If the decision result in the step S122 is YES or after the step S126, the step S127 reads the address information corresponding to the requested expanding address, from the compressed file 13. A step S128 reads the section of the corresponding compressed data from the compressed file, based on the address information. A step S129 decides whether or not the non-compression flag within the control information is set and ON. The process advances to a step S132 which will be described later if the decision result in the step S129 is YES, and the process advances to a step S130 if the decision result in the step S129 is NO.

The step S130 expands the section of the compressed data by the Huffman tree corresponding to the compression parameter type within the control information. The step S131 copies the expanded data to the storage region described above, based on the judging flag for judging whether the code is the 8-bit code or the 16-bit code, and the process advances to a step S133. In this case, if the section is the last section, the data of the variable-length section to the EOB is expanded and copied, because the EOB is added to the end of the section. If the section is the intermediate section other than the last section, the data of the 2-kbyte fixed-length section is expanded and copied, because the EOB delete flag which indicates that the EOB is deleted is included in the control information.

On the other hand, a step S132 copies the non-compressed data to the storage region described above, based on the judging flag for judging whether the code is the 8-bit code or the 16-bit code, and the process advances to the step S133. In this case, if the section is the last section, the non-compressed data of the variable-length section to the EOB is copied as it is, because the EOB is added to the end of the section. If the section is the intermediate section other than the last section, the non-compressed data of the 2-kbyte fixed-length section is copied as it is, because the EOB delete flag which indicates that the EOB is deleted is included in the control information.

The step S133 updates the address information of the section, and a step S134 decides whether or not the expansion of the data size requested with respect to the compressed file 13 is completed. If the decision result in the step S134 is NO, the step S127 reads from the compressed file 13 the address information corresponding to the expanding address of the next section. The step S128 reads the section of the corresponding compressed data from the compressed file 13, based on the address information corresponding to the expanding address of this next section, and the process advances to the step S129. On the other hand, the process ends if the decision result in the step S134 is YES.

Figure 14:
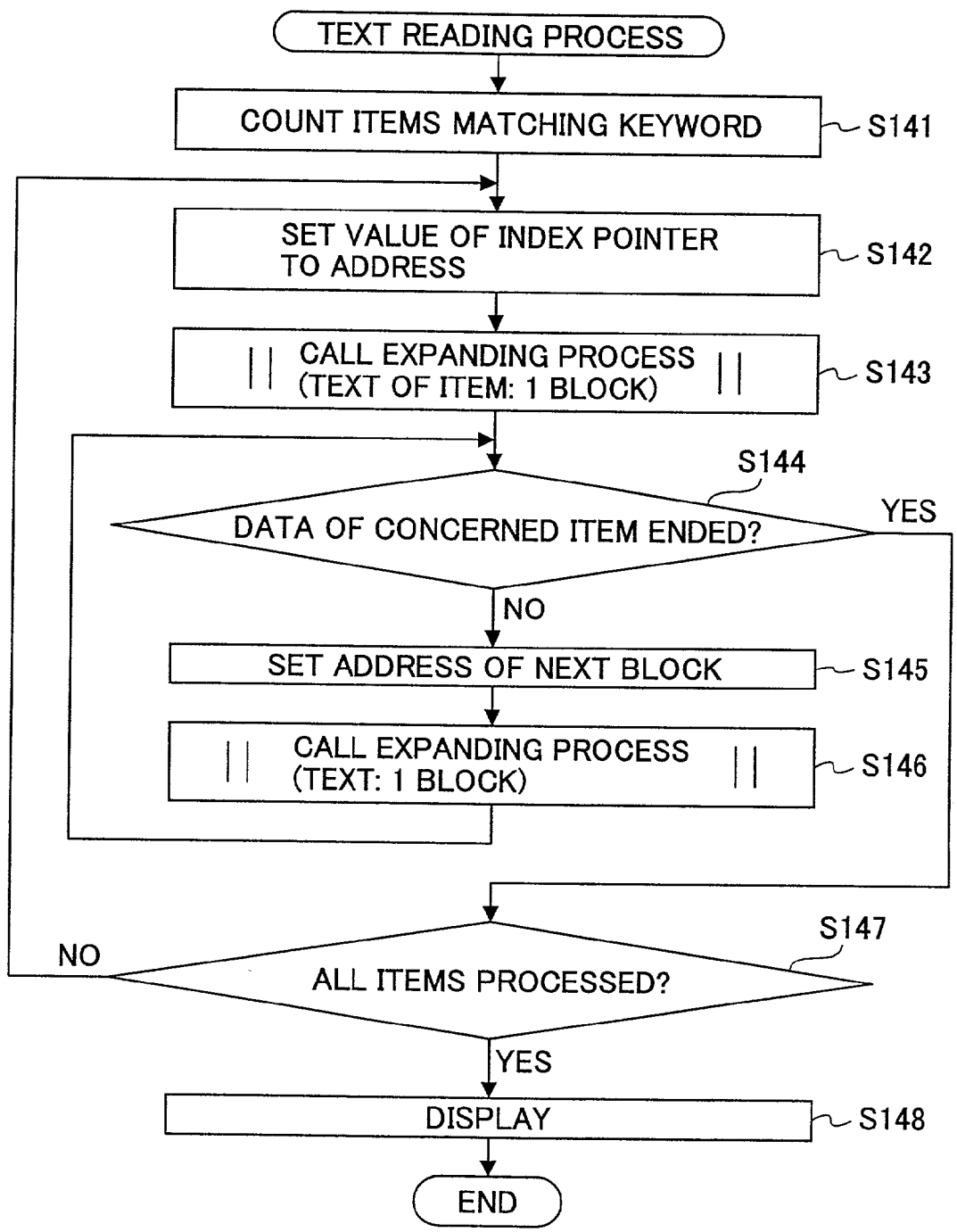
FIG. 14 is a flow chart for explaining a text reading process.

2c) Text Reading Process:

FIG. 14 is a flow chart for explaining a text reading process of the read process section 44 and the expanding process section 45 within the retrieval and display controller 31, that is, the process of the CPU 1 shown in FIG. 1.

In FIG. 14, a step S141 counts a number of items, which are within the expanded data, and match the index, based on the index data which is input by the user from the input section 33. A step S142 sets the value of the item pointer of the index to the address, based on the input index data. A step S143 calls the data expanding process, and reads the routine for causing the data expanding process to be carried out from the program for causing the file retrieval process to be carried out with respect to the file within the auxiliary storage unit 3, so as to expand the text amounting to one section, that is, the dictionary data amounting to one section, which is within the compressed file 13 and is indicated by the item pointer.

A step S144 decides whether or not the dictionary data indicated by the item pointer ended, and a step S145 sets the address of the next one section if the decision result in the step S144 is NO. In addition, a step S146 calls the data expanding process, and expands the dictionary data amounting to one section, which is within the compressed file 13 and is indicated by the item pointer, and the process returns to the step S144. On the other hand, if the decision result in the step S144 is YES, a step S147 decides whether or not the process with respect to all of the items is ended, based on the input index data. The process returns to the step S142 if the decision result in the step S147 is NO. If the decision result in the step S147 is YES, a step S148 displays the expanded dictionary data for all of the items by the retrieval result display section 35, and the process ends.

The step S148 may be carried out before the step S147. In this case, the step S148 displays the expanded dictionary data for each item by the retrieval result display section 35 every time.

In the embodiment described above, it is assumed for the sake of convenience that the section has the variable length. It is possible to improve the data expansion speed when the section has the variable length, because the length of the section can be set appropriately depending on the type or category of the data, so as to avoid the expansion of surplus data.

On the other hand, when the section has a fixed length, the data compression efficiency is improved, and the address information can be restored from the compressed file even if the address information before the compression of the section is stored in the compressed file. This is because the relative position of each section with respect to other sections can be calculated, since the section has the fixed length and the section number is added to each section.

In the case where the section has the variable length, it is necessary to store the address information before the compression of the section in the compression file. Accordingly, whether the section is to have the fixed length or the variable length may be determined depending on whether the priority is to be given to the data compression efficiency or the data expansion speed.

In addition, one or more dictionary files may be stored in the CD-ROM 6a. Even when a plurality of dictionary files related to a plurality of dictionaries, encyclopedias or the like are stored in the CD-ROM 6a, it is possible to specify the dictionary file which is to be retrieved, based on the dictionary file name or the dictionary file type within the management information shown in FIG. 9(e).

In the embodiment described above, the Huffman code is used for the data compression, but it is possible to use codes other than the Huffman code, such as the Universal code, as long as the data compression system is capable of efficiently compressing the dictionary data using the compression parameters which are common for each of the sections. Further, the data which is to be subjected to the data compression and expansion is not limited to the dictionary data, and also includes data of a database, including index and data.

Moreover, in the embodiment described above, the retrieval process is carried out by copying the program for causing the file retrieval process and the compressed file into the auxiliary storage unit 3. However, instead of copying the program and the compressed file into the auxiliary storage unit 3, it is possible to develop the program and the compressed file in the main storage unit 2 and to carry out processes similar to those described above.

The data compression efficiency is improved by the data compression process using the normal 8-bit Huffman code, by employing the compression algorithm of the above described embodiment. As a result, it is possible to reduce the recording region required to record the compressed file in the storage medium such as the hard disk, which is described above as the CD-ROM and the auxiliary storage unit. Although the data compression efficiency is improved by this compression algorithm, the processing time required to expand the compressed file is virtually unchanged from that required when expanding the compressed file which is compressed by the normal Huffman code.

The time required for the retrieval process includes a seek time of the reading unit (drive), a read time of reading the compressed file, and a expand time of the expanding process.

As described above, the recording region which is required to record the compressed file in the storage medium is reduced due to the data compression efficiency which is improved by the compression algorithm. For this reason, the seek time which is required by the retrieval process of the retrieval program is reduced, and the retrieval speed is improved as a result. This effect of improving the retrieval speed becomes further notable as the performance of the hardware is improved.

Next, a description will be given of a second embodiment of the file processing method and the data processing apparatus according to the present invention. This second embodiment of the file processing method and the data processing apparatus employs a second embodiment of the storage medium according to the present invention. In this second embodiment of the storage medium, the present invention is applied to a CD-ROM, but the storage medium itself is not limited to the CD-ROM, and the present invention is of course similarly applicable to storage media other than the CD-ROM, such as optical information storage media other than the CD-ROM, magneto-optical storage media such as magneto-optical disks, magnetic recording media such as floppy disks, and various kinds of semiconductor memory devices.

Figure 15:
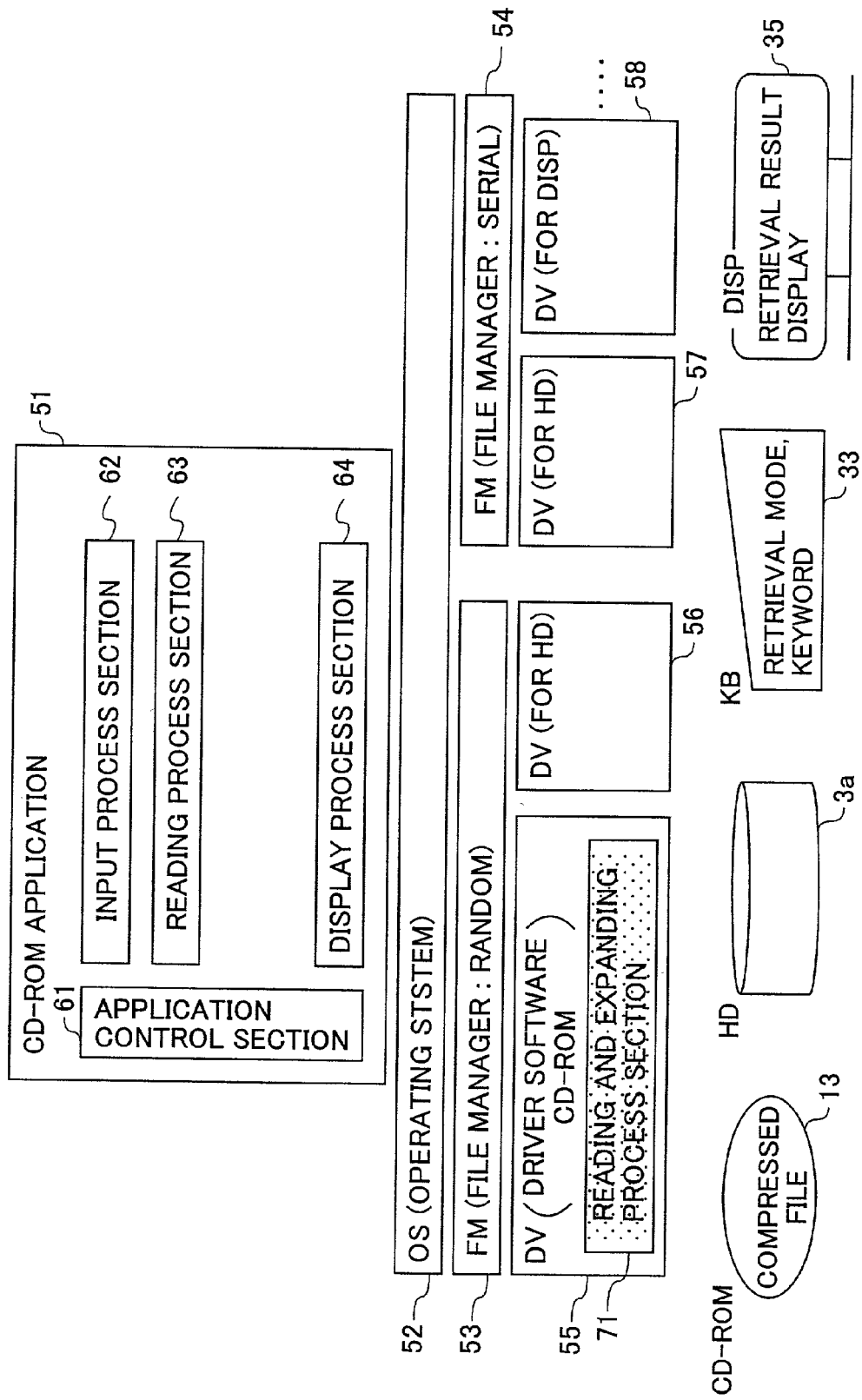
FIG. 15 is a system block diagram showing a structure of a retrieval and display controller of a second embodiment of the data processing apparatus according to the present invention.

The general structure of the computer system which employs the second embodiment of the file processing method is the same as that shown in FIG. 1, and corresponds to the second embodiment of the data processing apparatus. In the second embodiment of the data processing apparatus, the retrieval and display controller has a structure shown in FIG. 15. In FIG. 15, those parts which are the same as those corresponding parts in FIG. 11 are designated by the same reference numerals, and a description thereof will be omitted.

The retrieval and display controller shown in FIG. 15 generally includes a CD-ROM application 51, an operating system (OS) 52, a random file manager (FM) 53, a serial file manager (FM) 54, a driver software (DV) 55 for the CD-ROM 6*a*, driver softwares (DVs) 56 and 57 for the hard disk 3*a* and forming the auxiliary storage unit 3, and a driver software (DV) 58 for the display unit 5 and forming the auxiliary storage unit 3.

The CD-ROM application 51 includes an application control section 61, an input process section 62, a read process section 63, and a display process section 64. In addition, a reading and expanding process section 71 which corresponds to the read process sections 43 and 44 shown in FIG. 11 is provided within the DV 55. The application control section 61 corresponds to the retrieval controller 42 shown in FIG. 11, and determines contents and a control sequence of each process. The input process section 62 corresponds to the input process section 41 shown in FIG. 11, and inputs an operation mode and selects a target file. The read process section 63 and the reading and expanding process section 71 which is provided within the DV 55 read the concerned compressed data from the compressed file 13 and expands the concerned compressed data. Various processes are carried out based on the expanded data, and the display process section 64 displays a retrieval result on the retrieval result display section 35. The display process section 64 corresponds to the display process section 46 shown in FIG. 11. In this embodiment, the data stored in the compressed file 13 is not limited to the data made up of the index and the real data as in the case of the first embodiment where the data relates to the dictionary, encyclopedia or the like, and may be any kind of data. In addition, the data processing apparatus forms a file control apparatus.

The CD-ROM application 51 may be preinstalled in the auxiliary storage unit 3 or, read from the CD-ROM 6*a* or the like and installed into the auxiliary storage unit 3. In addition, the DV 55 may be preinstalled in the auxiliary storage unit 3, similarly to the DVs 56 through 58 or, read from the CD-ROM 6*a* and installed into the auxiliary storage unit 3. For the sake of convenience, it is assumed that the OS 52 and the FMs 53 and 54 are preinstalled in the auxiliary storage unit 3.

Accordingly, this second embodiment of the storage medium stores at least one of the compressed file 13 and the DV 55, and may further store the CD-ROM application 51.

Therefore, by providing an expansion library (reading and expanding process section 71) into the DV 55, this embodiment does not need to design the application software for each compressed file, and the reading and expanding process with respect to the compressed file can be made using the existing application software by merely modifying the DV 55.

Figure 16:
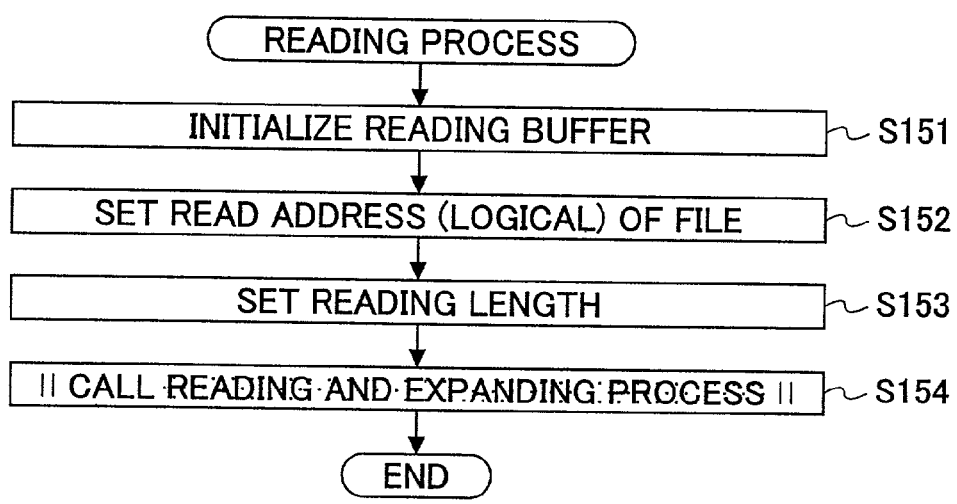
FIG. 16 is a flow chart for explaining a file reading process.

FIG. 16 is a flow chart for explaining a file reading process which is carried out by the read process section 63 of the CD-ROM application 51 together with the reading and expanding process section 71 of the DV 55, that is, the process of the CPU 1 shown in FIG. 1.

In FIG. 16, a step S151 initializes a read buffer within the CPU 1. A step S152 sets a read address (logical address) of the compressed file 13. A step S153 sets a read length of the section. In addition, a step S154 calls the read and expanding process, and the process ends.

Figure 17:
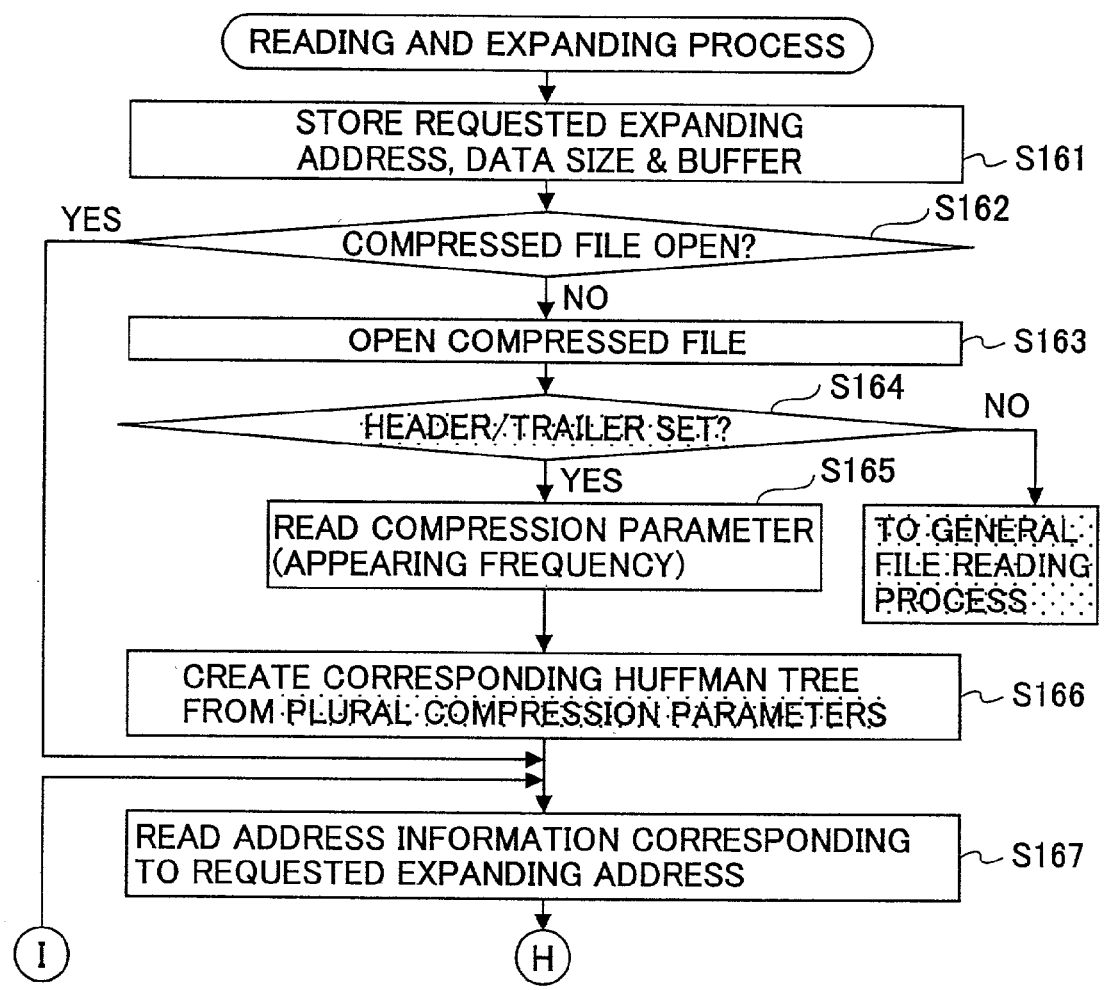
FIGS. 17A and 17B comprise a flow chart for explaining a reading and expanding process.

FIGS. 17A and 17B comprise a flow chart for explaining a reading and expanding process of the reading and expanding process section 71 of the DV 55, that is, the process of the CPU 1 shown in FIG. 1.

In FIGS. 17A and 17B, a step S161 stores a requested expanding address, data size and storage region into the auxiliary storage unit 3, based on the index data which is input by the user from the input section 33, and prepares a sufficiently large storage region within the auxiliary storage unit 3 with respect to the expanded data size. A step S162 decides whether or not the compressed file 13 which is read from the CD-ROM 6*a* and loaded into the auxiliary storage unit 3 is open. A step S163 opens the compressed file 13 within the auxiliary storage unit 3 if the decision result in the step S162 is NO. A step S164 decides whether or not a header and a trailer are set, and the process advances to a known general file process if the decision result in the step S164 is NO.

On the other hand, if the decision result in the step S164 is YES, a step S165 reads the compression parameters from the compressed file 13, and reads the appearing frequency of the 8-bit code, the 16-bit codes, and the appearing frequencies of the 16-bit codes within the compression parameters. A step S166 creates a corresponding Huffman tree with respect to each of the plurality of compression parameters, based on the appearing frequency of the 8-bit code and the appearing frequencies of the 16-bit codes, and the process advances to a step S167 which will be described later. A judging flag for judging whether the code is the 8-bit code or the 16-bit code is added to the data of the leaf of the Huffman tree.

If the decision result in the step S162 is YES or after the step S166, the step S167 reads the address information corresponding to the requested expanding address from the compressed file 13. A step S168 reads the section of the corresponding compressed data from the compressed file 13, based on the address information. A step S169 decides whether or not the non-compression flag within the control information is set and ON. The process advances to a step S172 which will be described later if the decision result in the step S169 is YES, and the process advances to a step S170 if the decision result in the step S169 is NO.

The step S170 expands the section of the compressed data by the Huffman tree corresponding to the compression parameter type within the control information, and a step S171 copies the expanded data to the storage region described above, based on the judging flag for judging whether the code is the 8-bit code or the 16-bit code. The process advances to a step S173 after the step S171. In this case, if the section is the last section, the data of the variable-length section to the EOB is expanded and copied because the EOB is added to the end of the section. If the section is an intermediate section other than the last section, the data of the 2-kbyte fixed-length section is expanded and copied since the EOB delete flag which indicates that the EOB is deleted is included in the control information.

On the other hand, the step 172 copies the non-compressed data to the storage region described above, based on the judging flag for judging whether the code is the 8-bit code or the 16-bit code, and the process advances to the step S173. In this case, if the section is the last section, the non-compressed data of the variable-length section to the EOB is copied as it is, because the EOB is added to the end of the section. If the section is the intermediate section other than the last section, the non-compressed data of the 2-kbyte fixed-length section is copied as it is, because the EOB delete flag which indicates that the EOB is deleted is included in the control information.

The step S173 updates the address information of the section, and a step S174 decides whether or not the expansion of the data size requested with respect to the compressed file 13 is completed. If the decision result in the step S174 is NO, the step S167 reads from the compressed file 13 the address information corresponding to the expanding address of the next section. The step S168 reads the section of the corresponding compressed data from the compressed file 13, based on the address information corresponding to the expanding address of this next section, and the process advances to the step S169. On the other hand, the process ends if the decision result in the step S174 is YES.

In this second embodiment, the CD-ROM application 51 using he CD-ROM 6a is described as the application, but the application is not limited to such. Any kind of application capable of treating a file may utilize the driver software which is applied with the present invention.

In addition, although the reading and expanding process section 71 is provided in the driver software for the CD-ROM, it is possible to also obtain the effects of the present invention by providing the reading and expanding process section 71 in a driver software (driver software for hard disk drive, driver software for floppy disk drive, and the like) corresponding to other storage units.

Further, the present invention is not limited to these embodiments, but various variations and modifications may be made without departing from the scope of the present invention.

The invention claimed is:

1. A computer implemented file processing method for compressing a section of data and index data comprising:
dividing both the data and the index data into a plurality of sections, wherein the index data is different from the data, the index data corresponds to the data and is used to search or retrieve the data, where each of the sections comprises the data and the index data, and the data comprises at least one of text data, image data, and audio data;
creating a conversion table for each section by selecting a predetermined number of 16-bit codes within the data in an order of appearing frequency, decomposing remaining non-selected 16-bit codes into 8-bit codes, and selecting the 8-bit codes in an order of appearing frequency;
compressing each of the sections based on the conversion table created therefor using a corresponding one of a plurality of different compression parameters to obtain a compressed file;
storing the compressed file in a storage medium together with address information and the different compression parameters of the sections after compression; and
expanding at least one of the sections in the compressed file read from the storage medium using the corresponding one of a plurality of different compression parameters for each section.

2. The file processing method as claimed in claim 1, wherein said compressing uses the plurality of different compression parameters based on a distribution of an appearing frequency for each word within a file.

3. The file processing method as claimed in claim 1, wherein said compressing comprises a flag, which indicates non-compressed data in control information of a certain section, if data in the certain section has a larger amount of information in a form of compressed data than the non-compressed data.

4. The file processing method as claimed in claim 1, wherein said compressing comprises identification information of the different compression parameters in control information of each section.

5. The file processing method as claimed in claim 1, wherein said compressing adds end information, which indicates an end of a section to an end of each section, adds the end information to only a last section when the sections have a fixed length, and comprises a flag indicating that the end information is deleted in control information of the sections other than the last section.

6. The file processing method as claimed in claim 1, further comprising:
expanding the compressed file, which is read from the storage medium by driver software, which is independent of application software of a computer.

7. A data processing apparatus comprises a processor for compressing a section of data and index data, comprising:
a compressing process section to divide both the data and the index data into a plurality of sections, and to compress each of the sections based on a conversion table using a corresponding one of a plurality of different compression parameters to obtain a compressed file after creating the conversion table for each section by selecting a predetermined number of 16-bit codes within the data in an order of appearing frequency, decomposing remaining non-selected 16-bit codes into 8-bit codes, and selecting the 8-bit codes in an order of appearing frequency,
wherein the index data is different from the data, the index data corresponds to the data and is used to search or retrieve the data, where each of the sections comprises the data and the index data, and wherein the data comprises at least one of text data, image data, and audio data;
a storing process section to store the compressed file in a storage medium together with address information and the different compression parameters of the sections after compression; and
an expanding process section to expand at least one of the sections in the compressed file read from the storage medium using the corresponding one of a plurality of different compression parameters for each section.

8. The data processing apparatus as claimed in claim 7, wherein said compressing process section uses the plurality of different compression parameters based on a distribution of an appearing frequency for each word within a file.

9. The data processing apparatus as claimed in claim 7, wherein said compressing process section comprises a flag that indicates non-compressed data in control information of a certain section if data in the certain section has a larger amount of information in a form of compressed data than the non-compressed data.

10. The data processing apparatus as claimed in claim 7, wherein said compressing process section comprises identification information of the different compression parameters in control information of each section.

11. The data processing apparatus as claimed in claim 7, wherein said compressing process section adds end information, which indicates an end of a section to an end of each section, adds the end information to only a last section when the sections have a fixed length, and comprises a flag indicating that the end information is deleted in control information of the sections other than the last section.

12. The data processing apparatus as claimed in claim 7, further comprising:
the expanding process section to expand the compressed file, which is read from the storage medium by driver software, which is independent of an application software of a computer.

13. A storage medium stores computer-readable information and a program for compressing a section of data and index data comprising:
compressing process means for causing a computer to divide both the data and the index data into a plurality of different sections, and to compress each of the sections based on a conversion table using a corresponding one of a plurality of different compression parameters to obtain a compressed file after creating the conversion table for each section by selecting a predetermined number of 16-bit codes within the data in an order of appearing frequency, decomposing remaining non-selected 16-bit codes into 8-bit codes, and selecting the 8-bit codes in an order of appearing frequency,
wherein the index data is different from the data, the index data corresponds to the data and is used to search or retrieve the data, where each of the sections comprises the data and the index data, and wherein the data comprises at least one of text data, image data, and audio data;
storing process means for causing the computer to store the compressed file in storage means together with address information and the different compression parameters of the sections after compression; and
expanding process means for causing the computer to expand at least one of the sections in the compressed file read from the storage means using the corresponding one of a plurality of different compression parameters for each section.

14. The storage medium as claimed in claim 13, wherein said compressing process means causes the computer to use the plurality of different compression parameters based on a distribution of an appearing frequency for each word within a file.

15. The storage medium as claimed in claim 13, wherein said compressing process means causes the computer to comprise a flag, which indicates non-compressed data in control information of a certain section, if data in the certain section has a larger amount of information in a form of compressed data than the non-compressed data.

16. The storage medium as claimed in claim 13, wherein said compressing process means causes the computer to comprise identification information of the different compression parameters in control information of each section.

17. The storage medium as claimed in claim 13, wherein said compressing process means causes the computer to add end information which indicates an end of a section to an end of each section, add the end information to only a last section when the sections have a fixed length, and comprise a flag indicating that the end information is deleted in control information of the sections other than the last section.

18. The storage medium as claimed in claim 13, wherein the program further comprising:
expanding process means which causes the computer to expand the compressed file, which is read from the storage means by a driver software, which is independent of an application software of the computer.

19. A storage medium stores computer-readable information for compressing and expanding a section of data and index data, comprising:
a region storing a compressed file which is divided into a plurality of sections, wherein each of sections is compressed based on a conversion table using a corresponding one of a plurality of different compression parameters after creating the conversion table for each section by selecting a predetermined number of 16-bit codes within the data in an order of appearing frequency, decomposing remaining non-selected 16-bit codes into 8-bit codes, and selecting the 8-bit codes in an order of appearing frequency;
a region storing address information of the sections and the different compression parameters thereof, wherein each of the sections comprises both the data and index data, where the index data is different from the data, the index data corresponds to the data and is used to search or retrieve the data, and wherein the data comprises at least one of text data, image data, and audio data; and
a region expanding at least one of the sections in the compressed file read from the storage medium using the corresponding one of the plurality of different compression parameters for each section.

20. The storage medium as claimed in claim 19, wherein the different compression parameters are based on a distribution of an appearing frequency for each word within said compressed file.

21. The storage medium as claimed in claim 19, wherein a flag, which indicates non-compressed data, is comprised in control information of a certain section if data in the certain section has a larger amount of information in a form of compressed data than the non-compressed data.

22. The storage medium as claimed in claim 19, wherein identification information of the different compression parameters is comprised in control information of each section.

23. The storage medium as claimed in claim 19, wherein end information, which indicates an end of a section, is added to an end of each section, the end information is added to only a last section when the sections have a fixed length, and a flag indicating that the end information is deleted is comprised in control information of the sections other than the last section.

24. The storage medium as claimed in claim 19, further storing:
a driver software is independent of application software of a computer,
said driver software comprising a program provided with expanding process means for causing the computer to expand the compressed file which is read from the storage medium.

25. A computer implemented file processing method for retrieving a section of data and index data, comprising:
a reading step accesses a storage medium which stores a plurality of different compression parameters, address parameters, and a compressed file formed from an original file, divided into a plurality of sections and compressed for each section based on a conversion table using a corresponding one of the plurality of different compression parameters,
wherein the conversion table is created for each section by selecting a predetermined number of 16-bit codes within the data in an order of appearing frequency, decomposing remaining non-selected 16-bit codes into 8-bit codes, and selecting the 8-bit codes in an order of appearing frequency, so as to obtain a plurality of section data forming the compressed file and address information corresponding to a plurality of sections, and
wherein each of the sections comprises both the data and the index data, where the index data is different from the data, the index data corresponds to the data and is used to search or retrieve the data, wherein the data comprises at least one of text data, image data, and audio data; and
an expanding step, which expands the section data in the compressed file, read from the storage medium by said reading step using the different compression parameters corresponding to the section data.

26. The file processing method as claimed in claim 25, wherein the plurality of different compression parameters are created based on a distribution of an appearing frequency for each word within said original file.

27. The file processing method as claimed in claim 25, wherein the compressed file further comprises non-compressed section data of a certain section and a non-compression flag which indicates that the certain section is non-compressed, and said expanding step suppresses expansion of the certain section when the non-compression flag indicates a non-compressed state of the section data of the certain section read from the storage medium by said reading step.

28. The file processing method as claimed in claim 25, wherein identification information of the different compression parameters is comprised in control information of each section.

29. The file processing method as claimed in claim 25, wherein a delete flag, which indicates that end information indicating an end of each section is not added to the section data, is comprised in control information of each section, and said reading step reads the section data by judging a last section based on the delete flag.

30. The file processing method as claimed in claim 25, wherein said expanding step is carried out by a driver software for the storage medium, said driver software being used for making access to the storage medium.

31. The file processing method as claimed in claim 30, wherein the diver software for the storage medium is independent of application software of a computer.

32. A data processing apparatus comprises a processor for compressing and expanding a section of data and index data, comprising:
    a reading process section to control access to a storage medium which stores a plurality of different compression parameters, address parameters, and a compressed file formed from an original file, divided into a plurality of sections and compressed for each section based on a conversion table using a corresponding one of the plurality of different compression parameters,
    wherein the conversion table is created for each section by selecting a predetermined number of 16-bit codes within the data in an order of appearing frequency, decomposing remaining non-selected 16-bit codes into 8-bit codes, and selecting the 8-bit codes in an order of appearing frequency, so as to obtain a plurality of section data forming the compressed file and address information corresponding to a plurality of sections, and
    wherein each of the sections comprises both the data and the index data, where the index data is different from the data, the index data corresponds to the data and is used to search or retrieve the data, wherein the data comprises at least one of text data, image data, and audio data; and
    an expanding process section to expand the section data in the compressed file read from the storage medium by said reading process section using the different compression parameters corresponding to the section data.

33. The data processing apparatus as claimed in claim 32, wherein the plurality of different compression parameters are created based on a distribution of an appearing frequency for each word within said original file.

34. The data processing apparatus as claimed in claim 32, wherein the compressed file further comprises non-compressed section data of a certain section and a non-compression flag which indicates that the certain section is non-compressed, and said expanding process section suppresses expansion of the certain section when the non-compression flag indicates a non-compressed state of the section data of the certain section read from the storage medium by said reading process section.

35. The data processing apparatus as claimed in claim 32, wherein identification information of the different compression parameters is comprised in control information of each section.

36. The data processing apparatus as claimed in claim 32, wherein a delete flag, which indicates that end information indicating an end of each section is not added to the section data, is comprised in control information of each section, and said reading process section controls reading of the section data by judging a last section based on the delete flag.

37. The data processing apparatus as claimed in claim 32, wherein said expanding process section carries out expansion by a driver software for the storage medium, said driver software being used for making access to the storage medium.

38. The data processing apparatus as claimed in claim 37, wherein the driver software for the storage medium is independent of application software of the data processing apparatus.

39. A data processing apparatus comprise a processor for retrieving a section of data and index data, comprising:
    a reading process section to control an access to a storage medium which stores a plurality of different compression parameters, address parameters, and a compressed file in response to a read request from an application software, the compressed file formed from an original file, divided into a plurality of sections and compressed for each section based on a conversion table using a corresponding one of the plurality of different compression parameters,
    wherein the conversion table is created for each section by selecting a predetermined number of 16-bit codes within the data in an order of appearing frequency, decomposing remaining non-selected 16-bit codes into 8-bit codes, and selecting the 8-bit codes in an order of appearing frequency, so as to obtain a plurality of section data forming the compressed file and address information corresponding to a plurality of sections, and
    wherein each of the sections comprises both the data and the index data, where the index data is different from the data, the index data corresponds to the data and is used to search or retrieve the data, wherein the data comprises at least one of text data, image data, and audio data; and
    an expanding process section to expand the section data in the compressed file read from the storage medium by said reading process section using the different compression parameters corresponding to the section data, and to supply expanded data to the application software.

40. A storage medium stores computer-readable information and stores a program for compressing and expanding a section of data and index data, comprising:
    reading process means for causing a computer to control access to a recording medium which stores a plurality of different compression parameters, address parameters, and a compressed file formed from an original file, divided into a plurality of sections and compressed for each section based on a conversion table using a corresponding one of the plurality of different compression parameters, wherein the conversion table is created for each section by selecting a predetermined number of 16-bit codes within the data in an order of appearing frequency, decomposing remaining non-selected 16-bit codes into 8-bit codes, and selecting the 8-bit codes in an order of appearing frequency, so as to obtain a plurality of section data forming the compressed file and address information corresponding to a plurality of sections, and wherein each of the sections comprises both the data and the index data, where the index data is different from the data, the index data corresponds to the data and is used to search or retrieve the data, wherein the data comprises at least one of text data, image data, and audio data; and expanding process means for causing the computer to expand the section data in the compressed file read from the recording medium by said reading process means using the different compression parameters corresponding to the section data.

41. The storage medium as claimed in claim 40, wherein the plurality of different compression parameters are created based on a distribution of an appearing frequency for each word within said original file.

42. The storage medium as claimed in claim 40, wherein the compressed file further comprises non-compressed section data of a certain section and a non-compression flag which indicates that the certain section is non-compressed, and said expanding process means causes the computer to suppress expansion of the certain section when the non-compression flag indicates a non-compressed state of the section data of the certain section read from the recording medium by said reading process.

43. The storage medium as claimed in claim 40, wherein identification information of the different compression parameters is comprised in control information of each section.

44. The storage medium as claimed in claim 40, wherein a delete flag, which indicates that end information indicating an end of each section is not added to the section data, is comprised in control information of each section, and said reading process means causes the computer to control reading of the section data by judging a last section based on the delete flag.

45. The storage medium as claimed in claim 40, wherein said expanding process means causes the computer to carry out expansion by a driver software for the recording medium, said driver software being used for making access to the recording medium.

46. The storage medium as claimed in claim 45, wherein the driver software for the recording medium is independent of an application software of the computer.

47. A storage medium stores computer-readable information and a program for retrieving a section of data and index data, comprising:

reading process means for causing a computer to control access to a recording medium which stores a plurality of different compression parameters, address parameters, and a compressed file, in response to a read request from application software, the compressed file formed from an original file, divided into a plurality of sections and compressed for each section based on a conversion table using a corresponding one of the plurality of different compression parameters, wherein the conversion table is created for each section by selecting a predetermined number of 16-bit codes within the data in an order of appearing frequency, decomposing remaining non-selected 16-bit codes into 8-bit codes, and selecting the 8-bit codes in an order of appearing frequency, so as to obtain a plurality of section data forming the compressed file and address information corresponding to a plurality of sections, and wherein each of the sections comprises both the data and the index data, where the index data is different from the data, the index data corresponds to the data and is used to search or retrieve the data, wherein the data comprises at least one of text data, image data, and audio data; and expanding process means for causing the computer to expand the section data in the compressed file read from the recording medium by said reading process means using the different compression parameters corresponding to the section data, and supply expanded data to the application software.

* * * * *

UNITED STATES PATENT AND TRADEMARK OFFICE
CERTIFICATE OF CORRECTION

PATENT NO. : 7,016,908 B2  
APPLICATION NO. : 10/073245  
DATED : March 21, 2006  
INVENTOR(S) : Masahiro Kataoka et al.

Page 1 of 1

It is certified that error appears in the above-identified patent and that said Letters Patent is hereby corrected as shown below:

Cover Page, line (73), change "kawasaki" to -- Kawasaki --

Cover Page, line (74), change "Staas, Halsey LLP" to -- Staas & Halsey LLP --

Column 23, line 27, change "diver" to -- driver --

Signed and Sealed this

Tenth Day of October, 2006

JON W. DUDAS  
*Director of the United States Patent and Trademark Office*